(12) United States Patent
Zervas et al.

(10) Patent No.: US 11,977,030 B2
(45) Date of Patent: May 7, 2024

(54) SYSTEMS AND METHODS FOR STOCHASTICALLY MODULATED RAMAN SPECTROSCOPY

(71) Applicant: Massachusetts Institute of Technology, Cambridge, MA (US)

(72) Inventors: Michael Zervas, Lincoln, RI (US); Ian W Hunter, Lincoln, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 107 days.

(21) Appl. No.: 17/574,427

(22) Filed: Jan. 12, 2022

(65) Prior Publication Data
US 2022/0136974 A1    May 5, 2022

Related U.S. Application Data

(63) Continuation of application No. PCT/US2020/041807, filed on Jul. 13, 2020.
(Continued)

(51) Int. Cl.
*G01N 21/65* (2006.01)

(52) U.S. Cl.
CPC . *G01N 21/658* (2013.01); *G01N 2201/06113* (2013.01); *G01N 2201/0635* (2013.01); *G01N 2201/08* (2013.01)

(58) Field of Classification Search
CPC ....... G01N 2201/0635; G01N 2201/08; G01N 21/65; G01J 3/1895; G01J 2003/4424; G01J 3/44
See application file for complete search history.

(56) References Cited

U.S. PATENT DOCUMENTS

| 7,773,217 B2 | 8/2010 | Sriram et al. |
| 8,368,883 B2 | 2/2013 | Palmskog et al. |

(Continued)

FOREIGN PATENT DOCUMENTS

| CN | 105044075 A | * | 11/2015 |
| CN | 105044075 A |   | 11/2015 |

OTHER PUBLICATIONS

Bremer et al. "Sewerage tunnel leakage detection using a fibre optic moisture-detecting sensor system." Sensors and Actuators A: Physical 220 (2014): 62-68.
(Continued)

*Primary Examiner* — Tarifur R Chowdhury
*Assistant Examiner* — Roberto Fabian, Jr.
(74) *Attorney, Agent, or Firm* — Smith Baluch LLP

(57) ABSTRACT

Disclosed herein are systems and methods of obtaining a derivative Raman spectrum using an excitation or Raman pump beam whose wavelength is modulated in any suitable manner such as, for example, stochastically. Shifting the wavelength of the input excitation by a small amount in approaches like SERDS can isolate the Raman scatter from other spectral artifacts and reduce the false detection rate. For example, an input excitation sequence can be correlated with the response of an individual pixel of a detector. From this, pixels that have captured Raman scattered photons can be separated from pixels capturing non-Raman photons. These techniques can be expanded to other fields and/or types of spectroscopies that utilize a dispersive element detector with time-dependent spectral features.

16 Claims, 33 Drawing Sheets

Related U.S. Application Data

(60) Provisional application No. 62/889,763, filed on Aug. 21, 2019, provisional application No. 62/873,443, filed on Jul. 12, 2019.

(56) References Cited

U.S. PATENT DOCUMENTS

| | | | |
|---|---|---|---|
| 8,456,629 | B2 | 6/2013 | Jalali et al. |
| 9,163,988 | B2 | 10/2015 | Dogariu |
| 9,638,638 | B2 | 5/2017 | Huber et al. |
| 2005/0007583 | A1 | 1/2005 | DiFoggio |
| 2005/0264808 | A1 | 12/2005 | Wang |
| 2010/0014078 | A1* | 1/2010 | Dholakia ............... G01J 3/28 356/301 |
| 2010/0265499 | A1* | 10/2010 | Carron ............... G01J 3/0272 356/301 |
| 2013/0050693 | A1* | 2/2013 | Villeneuve ............... G01J 3/44 356/402 |
| 2016/0066775 | A1 | 3/2016 | Hunter et al. |
| 2017/0146458 | A1 | 5/2017 | Huber et al. |
| 2017/0328836 | A1 | 11/2017 | Lu |
| 2019/0049300 | A1 | 2/2019 | Gu et al. |
| 2019/0086244 | A1* | 3/2019 | Deliwala ............... G02B 6/0208 |

OTHER PUBLICATIONS

Bruker Optics Inc., "Product overview: Infrared and raman spectrometers." http://fn-iq.com/wp-content/uploads/2014/04/Bruker-Optic.pdf. Accessed: Jan. 11, 2019, 86 pages.
Cohen "Pulse compression in radar systems." Principles of modern radar. Springer, Boston, MA, 1987. 465-501.
Edmund Optics "Understanding spatial filter." https://www.edmundoptics.com/ resources/application-notes/lasers/understanding-spatial-filters 2022, 1 page.
Elbasauney et al. "Instant detection and identification of concealed explosive-related compounds: Induced Stokes Raman versus infrared." Forensic science international 270 (2017): 83-90.
Enspectr enhanced spectromentry High Performance Raman Analyzes, 2021 accessed at http://enspectr.com, 7 pages.
Fbgs GmbH, "Fiber bragg grating (fbg) sensor principle." https://www.fbgs.com/technology/fbg-principle/. Accessed: Jan. 16, 2019, 3 pages.
FDA "The Drug Development Process." accessed at https://www.fda.gov/patients/learn-about-drug-and-device-approvals/drug-development-process. Content current as of Jan. 4, 2018, 1 page.
Haijou et al. "Assessment of the performance of a handheld Raman device for potential use as a screening tool in evaluating medicines quality." Journal of pharmaceutical and biomedical analysis 74 (2013): 47-55.
Hakonen et al. "Explosive and chemical threat detection by surface-enhanced Raman scattering: A review." Analytica chimica acta 893 (2015): 1-13.
Her et al. "The effects of adhesive and bonding length on the strain transfer of optical fiber sensors." Applied Sciences 6.1 (2016): 1, 9 pages.
Hong et al. "Application of FBG sensors for geotechnical health monitoring, a review of sensor design, implementation methods and packaging techniques." Sensors and Actuators A: Physical 244 (2016): 184-197.
International Search Report and Written Opinion in International Patent Application No. PCT/US2020/041807 dated Oct. 4, 2020, 9 pages.
Khetani et al. "Hollow core photonic crystal fiber as a reusable Raman biosensor." Optics express 21.10 (2013): 12340-12350.
Krasinski et al. "Optical nonreciprocal devices and their applications." Acta Physica Polonica A 86.1 (1994): 245-255.
Lopez_Lopez et al. "Infrared and Raman spectroscopy techniques applied to identification of explosives." TrAC Trends in Analytical Chemistry 54 (2014): 36-44.
Maiwald et al. "A portable shifted excitation Raman difference spectroscopy system: device and field demonstration." Journal of Raman Spectroscopy 47.10 (2016): 1180-1184.
Majumder et al. "Fibre Bragg gratings in structural health monitoring—Present status and applications." Sensors and Actuators A: Physical 147.1 (2008): 150-164.
Marmarelis et al. "The white-noise method in system identification." Analysis of physiological systems. Springer, Boston, MA, 1978. 131-180.
Mathworks MatLab Home page 2022 accessed from https://www.mathworks.com/products/matlab.html, 4 page.
Mosier-Boss et al. "Fluorescence rejection in Raman spectroscopy by shifted-spectra, edge detection, and FFT filtering techniques." Applied Spectroscopy 49.5 (1995): 630-638.
Nawrot et al. "Development of a mechanical strain amplifying transducer with Bragg grating sensor for low-amplitude strain sensing." Smart Materials and Structures 26.7 (2017): 075006, 10 Pages.
Ocean Optics "Qe pro scientific-grade spectrometer installation and operation manual." Accessed at https://www.oceaninsight.com/globalassets/catalog-blocks-and-images/manual-instruction-re-branded/spectrometers/mnl-1009-qepro-usermanual-rev-a.pdf. Accessed: Jan. 16, 2019. 28 pages.
Oh et al. "Single-pulse coherent anti-Stokes Raman spectroscopy via fiber Bragg grating." Frontiers in Ultrafast Optics: Biomedical, Scientific, and Industrial Applications XVI. vol. 9740. SPIE, 2016, 16 Pages.
Oh et al., "Investigation of fiber Bragg grating as a spectral notch shaper for single-pulse coherent anti-Stokes Raman spectroscopy." Optics Communications 383 (2017): 107-112.
Sersitive Sers Substrates Webpage access at https://www.sersitive.eu., 2022, 1 pages.
Silmeco Sers Substrates_webpage 2021e 2021 accessed from https://www.silmeco.com, 1 page.
Vorburger et al. "Applications of cross-correlation functions." Wear 271.3-4 (2011): 529-533.
Werneck et al. "A guide to fiber Bragg grating sensors." Current trends in short-and long-period fiber gratings (2013): 1-24.

* cited by examiner

Gaussian White Noise

First Order Low-pass Filter

Stochastic Binary Input Signal

SYSTEMS AND METHODS FOR STOCHASTICALLY MODULATED RAMAN SPECTROSCOPY

CROSS-REFERENCE TO RELATED APPLICATIONS

This application is a by-pass continuation application of International Application No. PCT/US2020/041807, filed Jul. 13, 2020, which claims priority to U.S. Provisional Application No. 62/873,443 filed Jul. 12, 2019, and to U.S. Provisional Application No. 62/889,763 filed Aug. 21, 2019, the entire disclosures of which are incorporated herein by reference.

BACKGROUND

Raman Spectroscopy provides a molecular fingerprint that is representative of the chemical composition of a sample. Yet, it suffers from high false detection rates, especially in compact form factors/formats. One common approach to reduce the false detection rate has been to increase the power of the Raman pump beam, i.e., to increase the resulting Raman signal relative or other artifacts in the spectrum. Another common approach is to shift the wavelength of the Raman excitation to near infrared, to reduce undesirable fluorescence signal or "noise."

Variable excitation approaches in Raman spectroscopy, also known as "Shifted Excitation Raman Difference Spectroscopy" (SERDS), are a relatively recent development that can isolate Raman scatter from other artifacts in the spectrum, and also reduce false detection rates. SERDS involves acquiring a pair of Raman spectra at slightly shifted excitation wavelengths, and then determining a difference between the Raman spectra. Because the excitation wavelength are close, but not identical, they produce shifted Raman spectra but (nearly) identical fluorescence spectra. Subtracting one Raman spectrum from the other Raman spectrum largely removes the common fluorescence spectra and leaves the difference between the Raman signatures at the different excitation wavelengths.

The advantages of SERDS can be understood by looking at a Jablonski diagram as shown in FIG. 1. In Raman spectroscopy, the electrons in target molecules are excited to a virtual energy state $S_v$. The Raman scattering process is nearly instantaneous since there is no change in electronic state. Conversely, fluorescence emission occurs when the electrons transition from a higher electronic state Si to a lower electronic state $S_0$. Kasha's rule states that this fluorescence emission occurs from the lowest vibrational energy level (shown here as Vo, for state Si) within a given electronic state. Such small changes in incident laser wavelength or energy will have little effect on the fluorescence spectrum but will proportionally shift the Raman scatter, and SERDS exploits this affect.

Additionally, other spectral artifacts, like spectral peaks associated with background light contamination, can be effectively separated from the spectrum through SERDS. Implementations of SERDS, however, have been limited, with few commercial systems in large formats/with large form factors.

One common implementation of SERDS includes temperature tuning of a laser diode providing an excitation beam. The use of laser diodes is non-ideal because this temperature sensitivity means the diode must be isolated from environmental temperature variations, and/or have an embedded temperature control system. Additionally, laser diodes typically operate through feedback in a gain medium. This feedback process gives rise to specific excitation modes, or wavelengths that have effective full-width half maxima (FWHM) that are too broad. Each mode contributes to the Raman scatter at the corresponding wavelength shift. Consequently, there is a broadening effect on the Raman scatter spectrum and an effect on the spectrum profile as the different modes have different intensities, in turn reducing molecular specificity of the system.

In addition, the strength of each excitation mode may not vary linearly with temperature, which can further affect the relative shape of the spectrum, and in turn degrade the ability to use, as reference, existing curves/peaks to identify chemical constituents. Another effect of using temperature to modulate the excitation wavelength is the time required for the laser to stabilize, which can take up to a few minutes, depending on the diode and the external environment. This extra stabilization time increases the overall duration of the measurement. As an example, effect of temperature variations on the spectrum of a laser diode module (the Thorlabs CPS635S collimated laser diode module) are shown in FIG. 15.

Alternatively, a number of new lasers have been developed in a compact format that provides narrow linewidths. Some examples include Distributed Bragg Reflector (DBR) lasers, Distributed Feedback (DFB) lasers, and Vertical Cavity Surface Emitting Lasers (VCSELs). The narrow linewidth of these lasers works well for Raman spectroscopy. Many of these devices operate in the visible to NIR/IR wavelength range, but their modulation bandwidth is limited. These devices cannot be adjusted by more than a few picometers in operational wavelength and are prone to mode hopping as they are adjusted. Moreover, this mode hopping can vary from device to device.

Accordingly, there is a need for systems and methods that enable more versatility for improved performance in variable excitation Raman Spectroscopy systems such as SERDS that employ variable wavelengths for sample excitation.

SUMMARY

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

A system includes a light source to illuminate a sample with an excitation signal that switches between a first excitation wavelength and a second excitation wavelength. The system also includes a spectrometer to detect a spectrum of an emission signal generated by a sample in response to excitation with the excitation signal. The emission signal includes, for each excitation wavelength, a measure of emission intensity for each emission wavelength of the emission signal from the sample for that excitation wavelength. The system further includes a processor communicably coupled to the light source and to the spectrometer. The processor computes a measure of correlation for each emission wavelength in the spectrum of the emission signal with the first excitation wavelength and the second excitation wavelength. The processor also classify each emission wavelength as including Raman scatter where the measure of correlation for that emission wavelength exceeds a predetermined threshold.

A method of Raman spectroscopy includes generating an excitation beam with a light source switching between a set of excitation wavelengths. The method also includes generating excitation information associated with the excitation beam. The excitation information includes a measure of excitation intensity for each excitation wavelength of the set of excitation wavelengths. The method further includes illuminating a sample with the excitation beam and detecting, for each excitation wavelength, an emission signal from the sample in response to the excitation beam. The method also includes generating emission information associated with the emission signal. The emission information includes, for each excitation wavelength, a measure of emission intensity for each emission wavelength of the emission signal from the sample for that excitation wavelength. The method further includes computing a measure of correlation for each emission wavelength and the excitation information, and classifying each emission wavelength as including Raman scatter where the measure of correlation for that emission wavelength exceeds a predetermined threshold.

A system for Raman spectroscopy includes a broadband light source to generate a light beam and an optical circulator including a first port, a second port, and a third port, to receive the light beam at the first port and to output the light beam at the second port. The system also includes a fiber Bragg grating to receive the Raman pump beam from the second port and to reflect a portion of the light beam back into the second port as a Raman pump beam. The optical circulator device outputs the Raman pump beam from the third port.

A method of Raman spectroscopy includes generating a light beam with a superluminescent light emitting diode and coupling, via an optical circulator, the light beam to a fiber Bragg grating. The method further includes stochastically modulating a reflection band of the fiber Bragg grating between a first wavelength and second wavelength such that the fiber Bragg grating reflects a portion of the light beam back to the optical circulator as an excitation beam with a stochastically modulated wavelength. The method further includes exciting, via the optical circulator, a sample with the excitation beam and detecting a Raman signal emitted by the sample in response to the excitation beam. The method also includes determining a spectrum of the Raman signal based on the stochastic modulation of the reflection band of the fiber Bragg grating.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

Disclosed herein are systems and methods of obtaining a derivative Raman spectrum using an excitation or Raman pump beam whose wavelength is modulated in any suitable manner such as, for example, stochastically. Excitation wavelength modulation in Raman spectroscopy has several benefits, including more effectively separating the Raman spectrum from other spectral artifacts, as will be described in more detail herein. Modulation of the input excitation wavelength in Raman spectroscopy can be accomplished through a number of methods that range in cost, size, and complexity. Some examples/techniques to which stochastic wavelength modulation as described herein can be applied includes: (1) a temperature controlled laser diode, (2) large tunable laser sources, and/or (3) rotating the angle of a notch filter to selectively shift the cutoff wavelengths.

Externally Modulated Variable Excitation Raman Spectrometer

Figure 12:
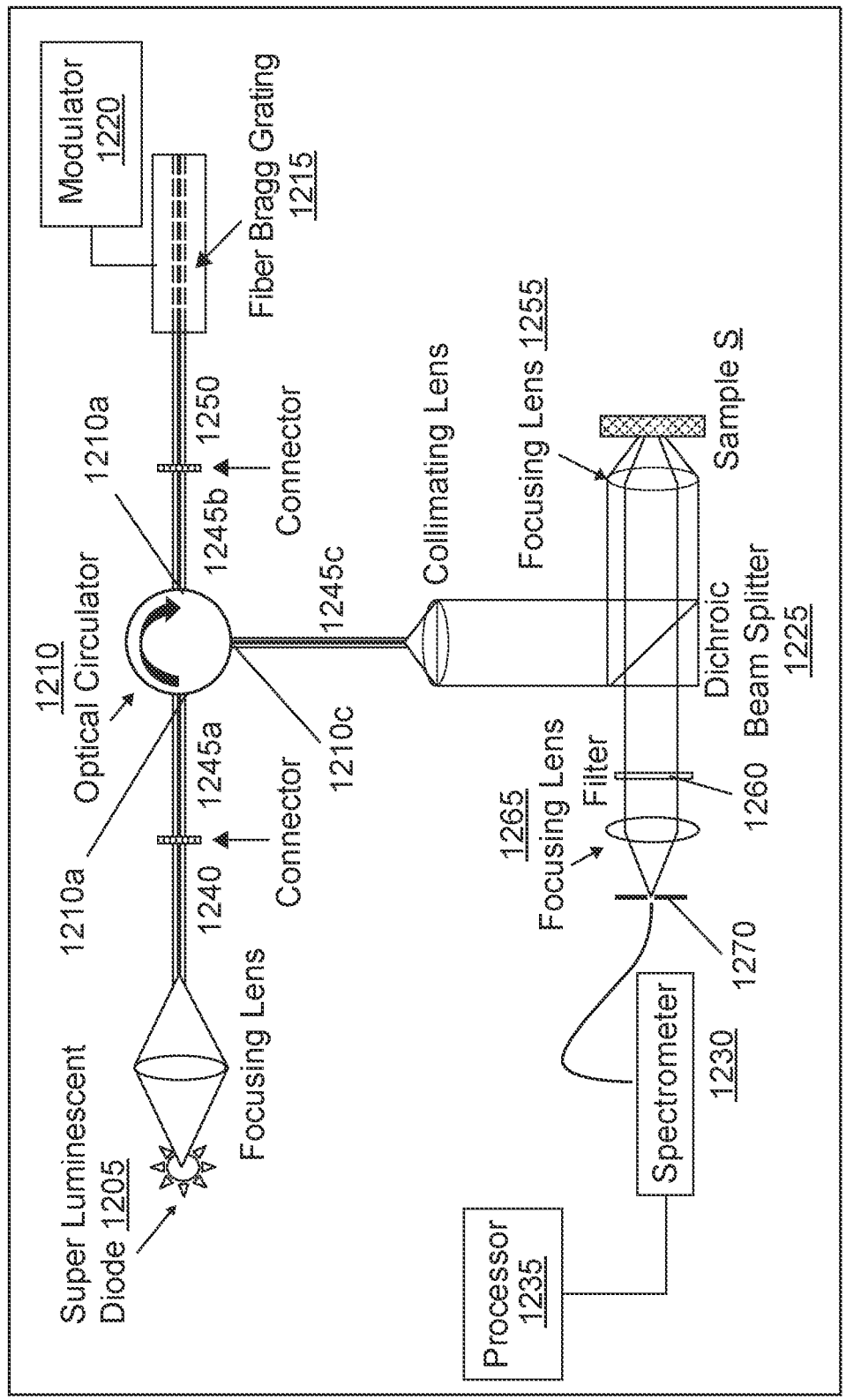
FIG. 12 illustrates a system for variable excitation Raman Spectroscopy.

Systems and methods described herein modulate the excitation wavelength for Raman spectroscopy (i.e., the wavelength of the Raman pump beam). In some cases, the modulation can be achieved by decoupling the light source (e.g., a laser) and the components used for modulation of the excitation beam from the light source. FIG. 12 illustrates an example system 1200 that includes a light source 1205 and a modulator 1220.

The light source 1205 can be any suitable spatially coherent (e.g., for producing a small focus spot size on the sample), broad bandwidth light source such as, for example, a superluminescent light emitting diode (SLED) as illustrated in FIG. 12. SLEDs are devices that output light over a relatively broad spectrum as compared to traditional lasers. The SLED 1205 can have an output spectrum with, for example, a 3 dB full-width half-maximum (FWHM) ranging from about 4 nm to about 100 nm, and a center wavelength from about 600 nm to about 1600 nm, including all values and sub-ranges in between. SLEDs generally have high spatial coherence combined with low temporal coherence. One benefit of high spatial coherence in Raman spectroscopy is that the output from SLEDs such as the SLED 1205 can be focused to a small spot size and can increase or maximize the local intensity, which in turn increases the intensity of the Raman scatter. In addition, a SLED's high spatial coherence can allow its output to be efficiently coupled into a single-mode fiber, such as the fiber 1240, for compact design.

Figures 11A, 11B:
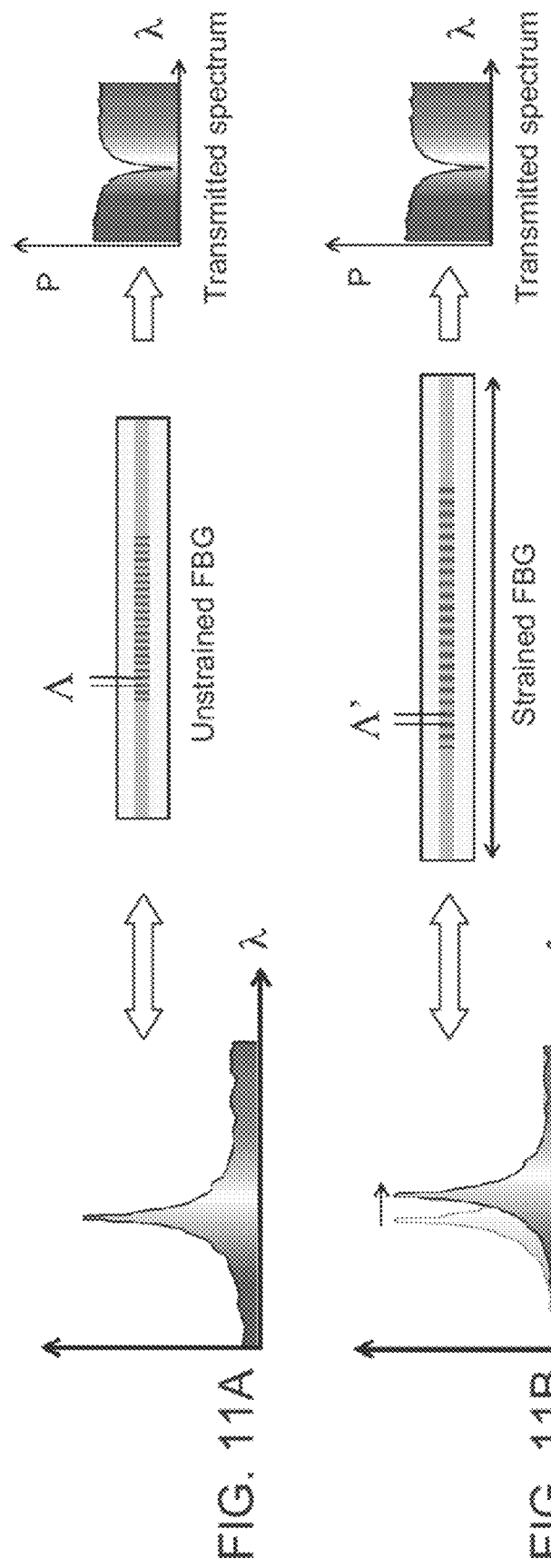
FIG. 11A illustrates an unstrained fiber Bragg grating (FBG) and its transmission characteristics.
FIG. 11B illustrates the example transmission characteristics of the FBG of FIG. 11A when strained.

Turning to components for modulating the outputs of light sources such as SLEDs, an example modulation component useful for the systems and methods described herein is a Fiber Bragg Grating (FBG) coupled to a modulator, such as the FBG 1215 and the modulator 1220 illustrated in FIG. 12. The FBG 1220 can be made, for example, from a germanium-doped silica, single-mode fiber with selective index of refraction changes along a portion of the fiber. The selective refractive index changes form a grating that reflects incident light at a center wavelength given by the grating period and over a passband given by the number of grating periods. An FBG can be characterized as a specialized optical fiber that reflects a narrow portion of a spectrum, while allowing the remainder of the spectrum to continue propagating, hence acting as an optical filter that rejects the narrow portion while being transparent for the remainder portion. For example, the FBG 1220 can exhibit reflectivity of about 90% or more, and yield a FWHM of 25 picometers or less for the reflected/rejected beam. FBGs find use for strain sensing in wind turbines, pressure sensing, temperature sensing, and acceleration sensing. As illustrated in FIGS. 11A and 11B, as the FBG in FIG. 11A is strained or expands, e.g., due to changes in temperature or strain, the portion of the spectrum that is back reflected or rejected changes in response, i.e., is shifted (see FIG. 11B). For example, the shift can be from about 1 picometer/microstrain to about 10 picometers/microstrain on average, including all values and sub-ranges in between.

The modulator 1220 coupled to the FBG 1215 can control the strain in the FBG 1215 and in turn, its transmission/reflection characteristics. For example, the modulator 1220 can include a piezoelectric actuator that, upon application of a voltage, undergoes a displacement and in turn, by virtue of its physical coupling to the FBG 1215, induces or changes a strain it imposes on the FBG. Said another way, the spectral response of the FBG 1215 can be modulated by applying a voltage to the piezoelectric actuator. The switching speed can be based on the modality employed to apply the voltage to the piezoelectric actuator such as, for example, a function generator switching at tens of MHz. Faster switching speeds can also be achieved using custom circuits, transistors, and/or the like. The result can be a change in a center wavelength of the reflection band of the FPG 1215. In some cases, the change in this center wavelength can be up to 2.5 nm.

In some cases, temperature changes can also or alternatively be used to change the spectral response of the FBG 1215. Other example modulators can include, but are not limited to, flexures for amplified strain, thermo-electric cooler (TEC) devices for thermal changes, acoustic transducers for induced pressure waves, and/or the like.

The combination of the SLED 1205 with the FBG 1215 can enable a narrow/specific selection of the beam profile that can be modulated depending on the state of the FBG 1215. As illustrated in FIG. 12, the output light beam from the SLED 1205 can be coupled into the single-mode fiber 1240. The single-mode fiber 1240 can act as a spatial filter to produce a Gaussian beam profile for the light beam, with the high spatial frequency components removed. The beam can then be coupled from the fiber 1240 into a fiber 1245 coupled to a first port 1210a of a three-port optical circulator 1210. The optical circulator 1210 can be any suitable optical device where light entering one port exits at the next port (e.g., light entering the first port 1210a exits at a second port 1210b, and light entering the second port 1210b exits at a third port 1210c).

The optical circulator 1210 can output the beam entering at the port 1210a to the port 1210b, which is coupled to another single-mode optical fiber 1245b. The fiber 1245b can be in turn connected to the fiber 1250 to deliver the light beam to the FBG 1215. The FBG 1215 reflects back a portion of the beam at the selected wavelength(s) (i.e., selected based on how much strain is applied to the FBG through the modulator 1220) into the fiber 1250, and as input to the port 1210b. The other spectral components/portions of the beam continue to pass through the FBG 1215 and exit the FBG at its other end. This back reflected beam, also sometimes referred to as a Raman pump beam, then re-enters the optical circulator 1210, which and redirects the pump beam to the third port 1210c, which can have a fiber 1245c coupled to it. The beam exits the fiber 1245c and is collimated, reflected off a dichroic beam splitter 1225, and focused onto a sample S via a focusing lens 1255. Scattered light is recollected in a backscatter configuration from the lens 1255 and propagates back to the dichroic beam splitter 1225, which has different transmission and reflection characteristics at different wavelengths that are selected to transmit any Raman shifted light from the sample S. A second filter 1260 can further remove any Rayleigh scatter arising from the sample due to the excitation beam, which can be a bandpass filter, or a notch filter for the laser wavelength. The remaining Raman scatter can then be focused via lens 1265 and pass through a narrow slit 1265 into a dispersive element spectrometer 1230.

The spectrometer 1230 can be employed to detect the emission spectrum generated by the sample S in response to the excitation signal. A processor 1235 is coupled to the spectrometer 1230 to analyze the spectrometer output. The processor 1235 can be any suitable processing device configured to run and/or execute a set of instructions or code associated with the system 1200. The processor 1235 can be, for example, a general purpose processor, a Field Programmable Gate Array (FPGA), an Application Specific Integrated Circuit (ASIC), a Digital Signal Processor (DSP), and/or the like. In some cases, the system 1200 can also include a memory and or a database (not shown). The memory/database can encompass, for example, a random access memory (RAM), a memory buffer, a hard drive, a database, an erasable programmable read-only memory (EPROM), an electrically erasable read-only memory (EEPROM), a read-only memory (ROM), Flash memory, and/or so forth. The memory/database can store instructions to cause the processor 1235 to execute processes and/or functions associated with the system 1200, such as control of the light source 1205, the modulator 1220, the spectrometer 1230, and/or the like.

As described in more detail below, the processor 1235 can compute a correlation (e.g., cross-correlation) for each emission wavelength in the emission spectrum with each of the excitation wavelengths reflected by the FBG 1215. If the correlation measure is above some predetermined criterion or threshold, the processor 1235 can deem or classify that emission wavelength as Raman scatter; if not, it can be classified as non-Raman scatter (e.g., fluorescence). The processor can also generate a derivative spectrum, including a scaled derivative spectrum using the correlation information as explained below.

In summary, the system 1200 has the advantage, over conventional systems, of completely decoupling/isolating the source 1205 from the laser selective filter (e.g., the FBG 1215). When a SLED is the light source 1205, it can have high spatial coherence for focusing to a small, diffraction-limited spot and efficient single-mode fiber coupling (e.g., 30% or higher, depending on the specific optical configuration) for a compact design relative to standard laser diodes. In addition, SLEDs have a fairly broad FWHM spectrum, such that a large bandwidth of selectable wavelengths are available for use when using FBGs. In addition, power and temperature can be stabilized on the SLED independent of the FBG, which can lead to lower flicker noise.

FBGs offer relatively narrower linewidth reflected beams (on the order of 10's of picometers). In addition, straining of the FBG can be performed at much higher frequencies than temperature modulation of a laser diode module. Therefore, the system can operate significantly faster, and with fewer transient effects (such as, for example, time required to stabilize operation when using thermal control), than conventional systems, which can suffer from reduced spectral quality due to such transient effects. Additionally, FBGs can be manufactured at both NIR/IR wavelengths as well as at visible wavelengths, making them versatile for use in other types of Raman spectroscopies, including Surface Enhanced Raman Spectroscopy (SERS).

Figure 13:
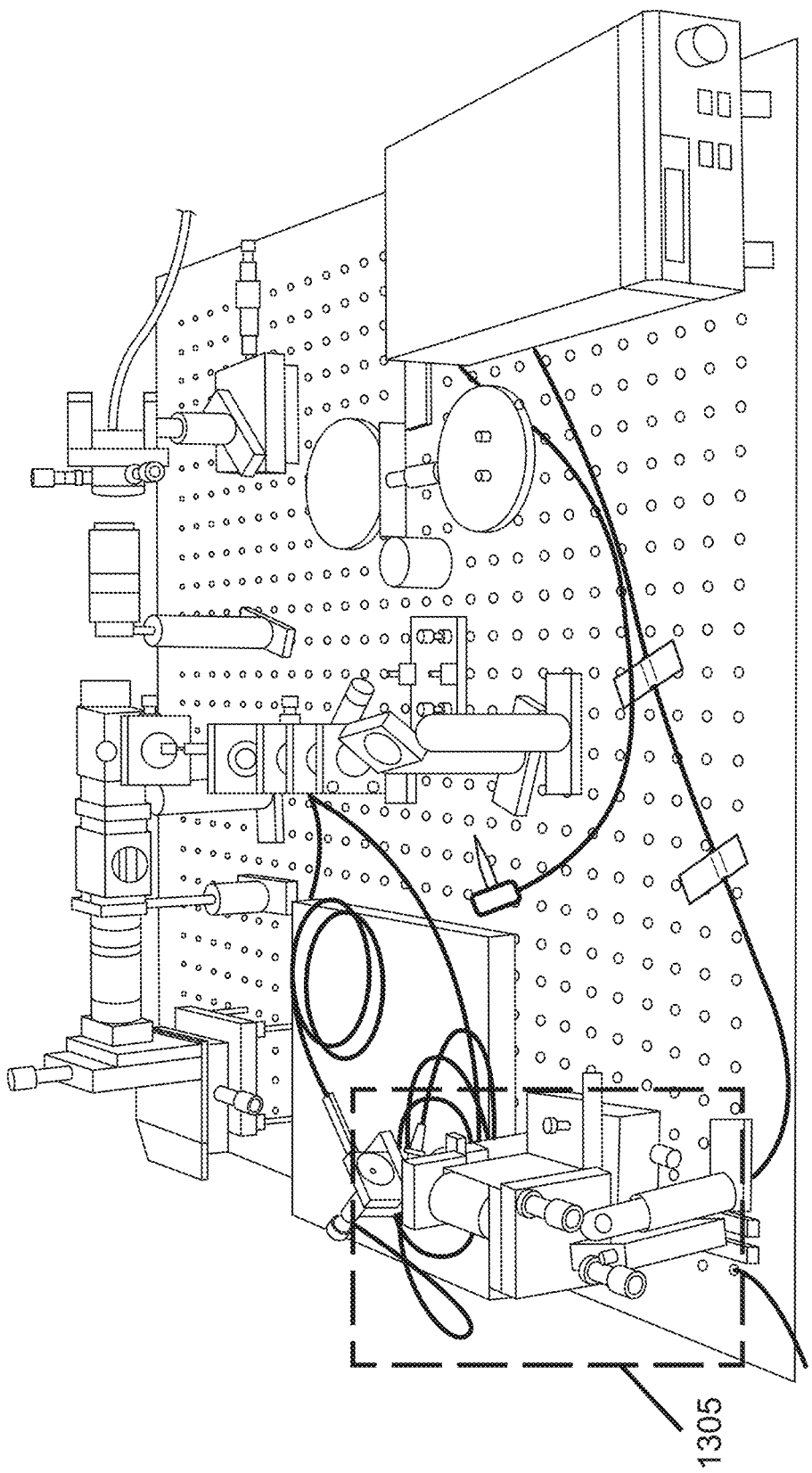
FIG. 13 illustrates an example setup for the system of FIG. 12.
Figure 14:
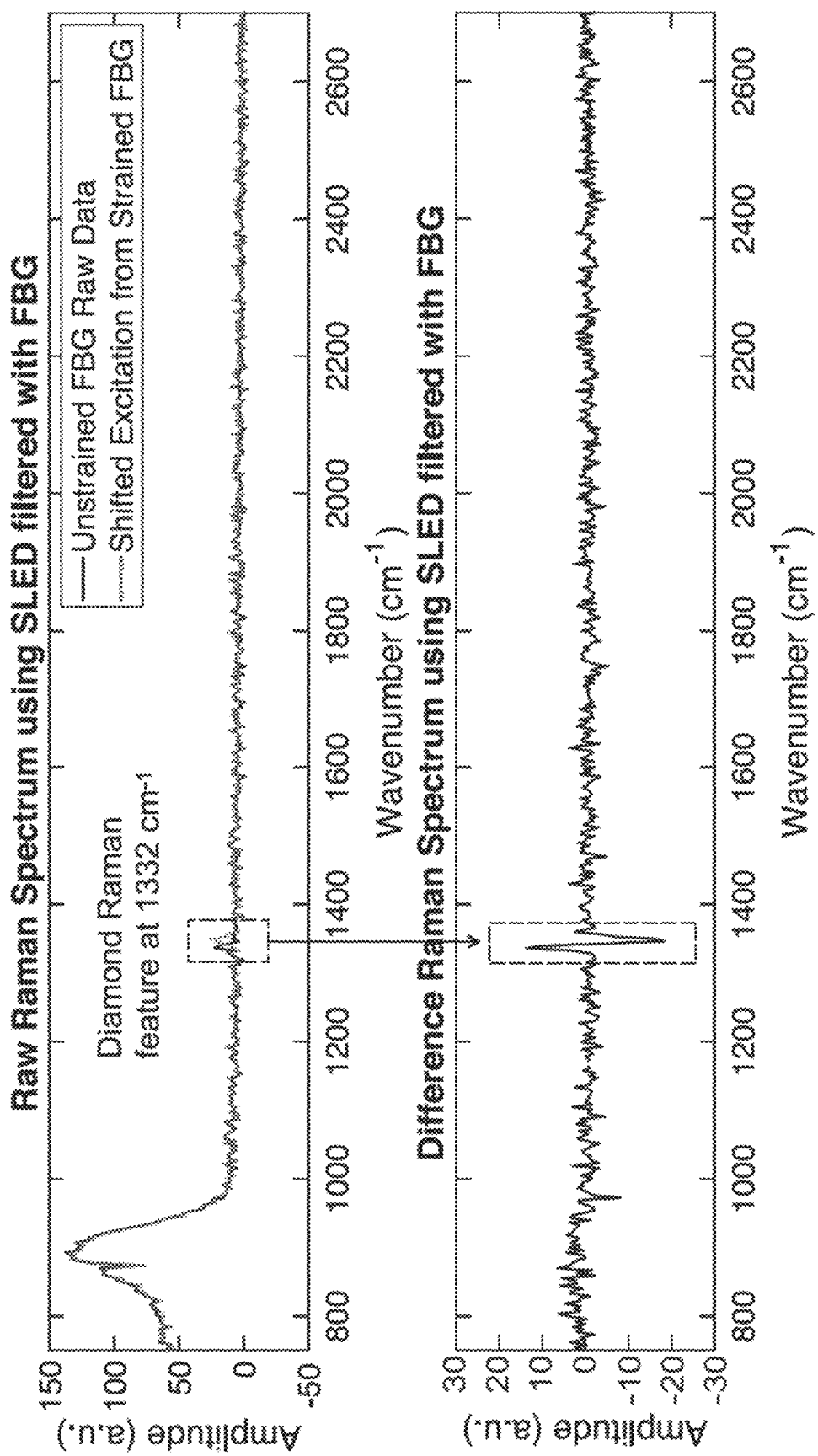
FIG. 14 illustrates (top plot) Raman spectra acquired with strained and unstrained FBGs, and (bottom plot) a difference Raman spectrum of the spectra in the top plot.
Figure 15:
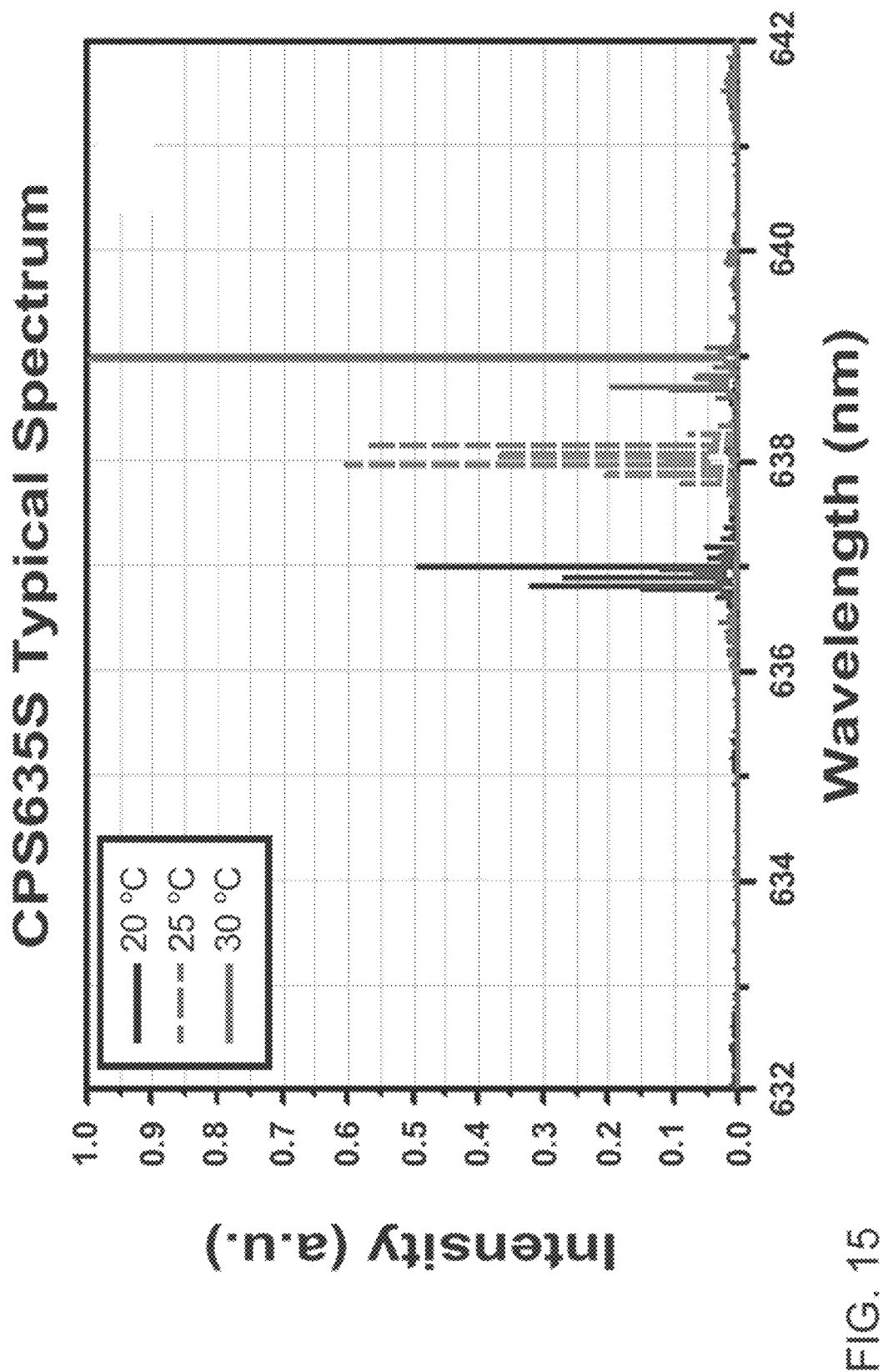
FIG. 15 is a plot illustrating temperature sensitivity of the emission spectrum of a Thorlabs laser diode.

An example implementation of the system 1200 is shown in FIG. 13. A SLED 1305 coupled into an FBG can provide a reflected beam sufficient to produce Raman scatter. The system was tested using a diamond sample with a Raman scatter at a characteristic 1332 $cm^{-1}$ location. The raw spectrum is shown in FIG. 14 (top plot) under two strain conditions (unstrained and strained). The amount of scatter from the diamond sample is low compared to other spectral features. FIG. 14 (bottom plot) shows the difference between these two spectra with a significant shift occurring in the Raman scatter location.

Theory of Operation and Signal Analysis

Any of the analytical aspects described below can be performed by a processor or controller that is coupled to a detector, or received emission information from a detector such as, for example, the processor 1235 coupled to the spectrometer 1230, the processor 1535 described with respect to FIG. 16, and/or the like.

Figure 1:
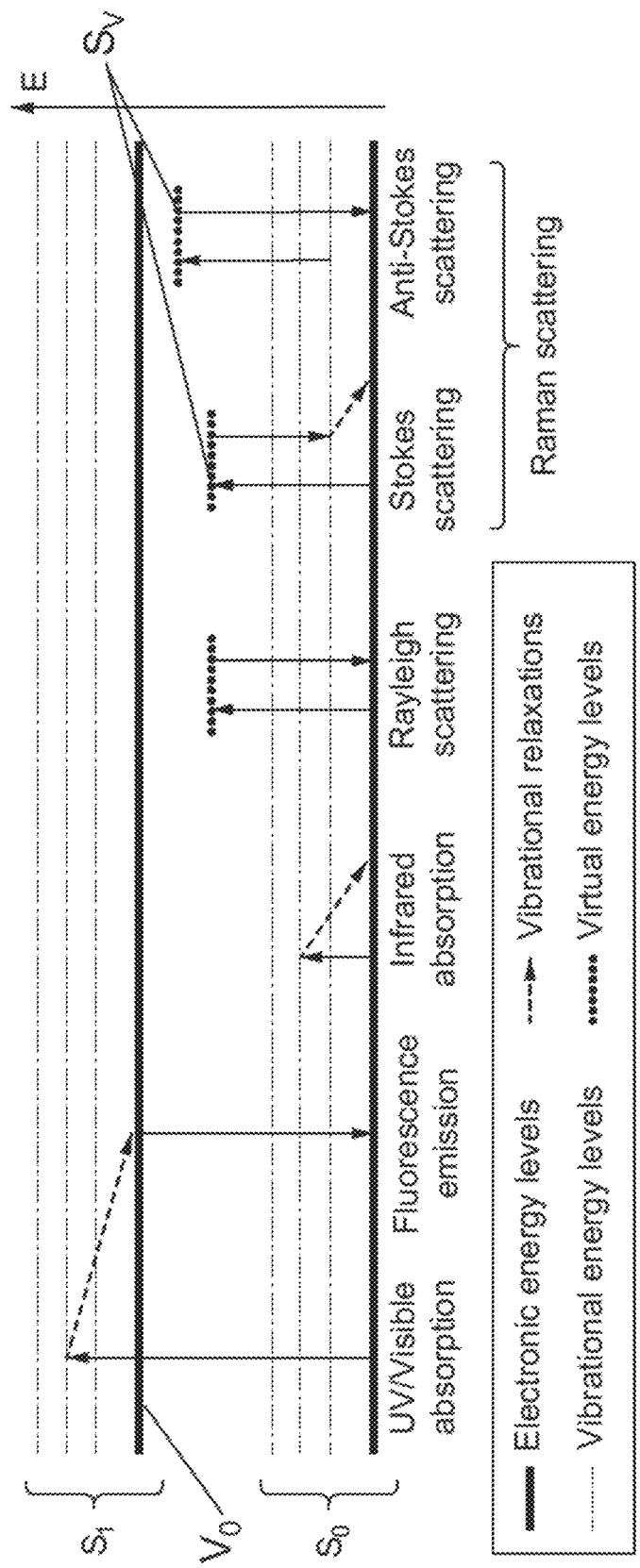
FIG. 1 illustrates a Jablonski Diagram.
Figure 2:
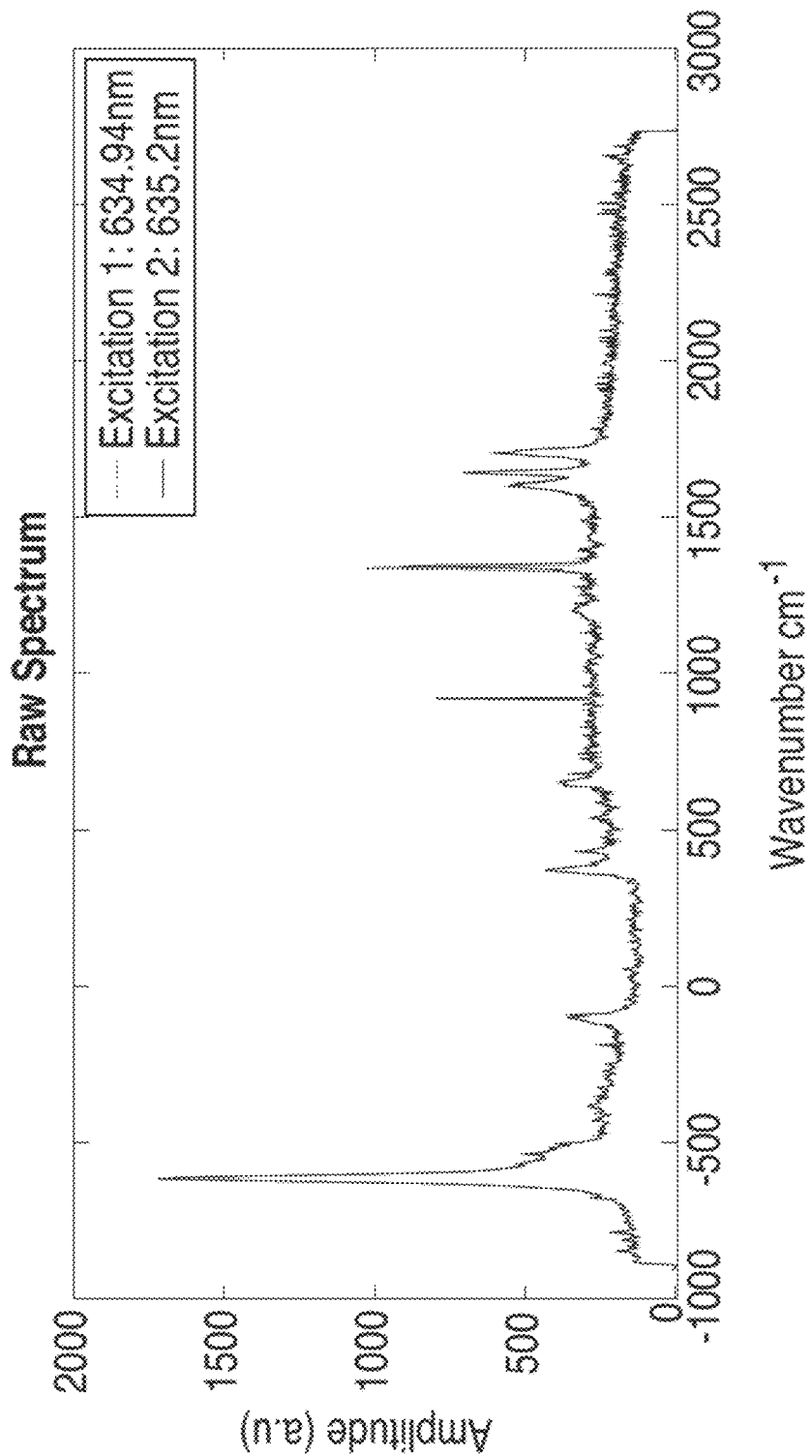
FIG. 2 is a plot illustrating example emission spectra in a sample for two different excitation wavelengths.
Figure 3:
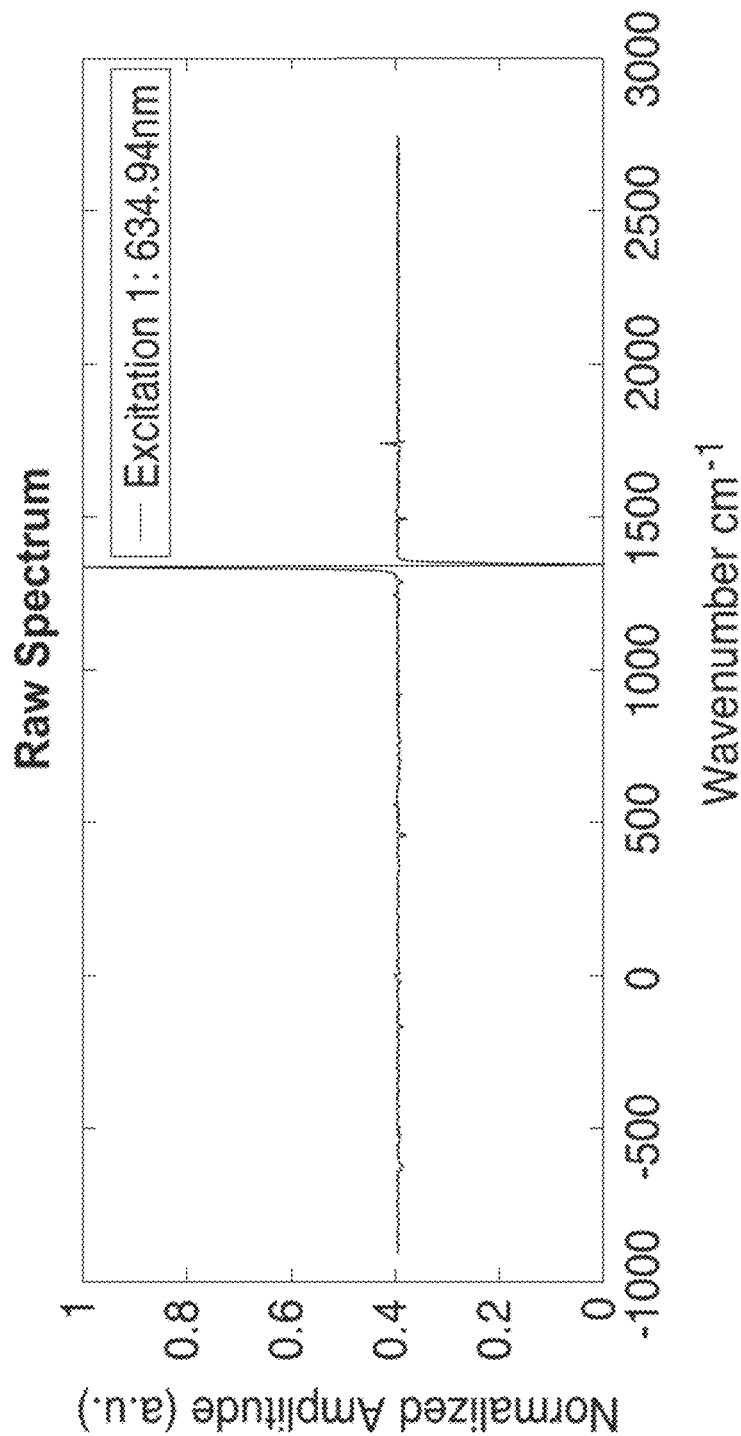
FIG. 3 is a plot illustrating a difference spectrum calculated by subtraction of the emission spectra of FIG. 2.

One benefit of variable/shifted excitation approaches in Raman spectroscopy is the ability to separate Raman scatter, which is a nearly instantaneous response proportional to the input excitation, from other artifacts in the spectrum like fluorescence or a relatively unchanged background. FIG. 2 shows emission data collected at two different excitation wavelengths from a sample of a CVD (chemical vapor deposition) diamond, which has a sharp characteristic Raman scatter peak located at approximately 1332 $cm^{-1}$. There are a number of features in this spectrum that could be associated with Raman scatter. Yet, subtraction of the data sets shows a characteristic derivative-like feature corresponding to the Raman scatter at 1332 $cm^{-1}$. This corresponding, subtracted spectrum is shown in FIG. 3.

Figure 4:
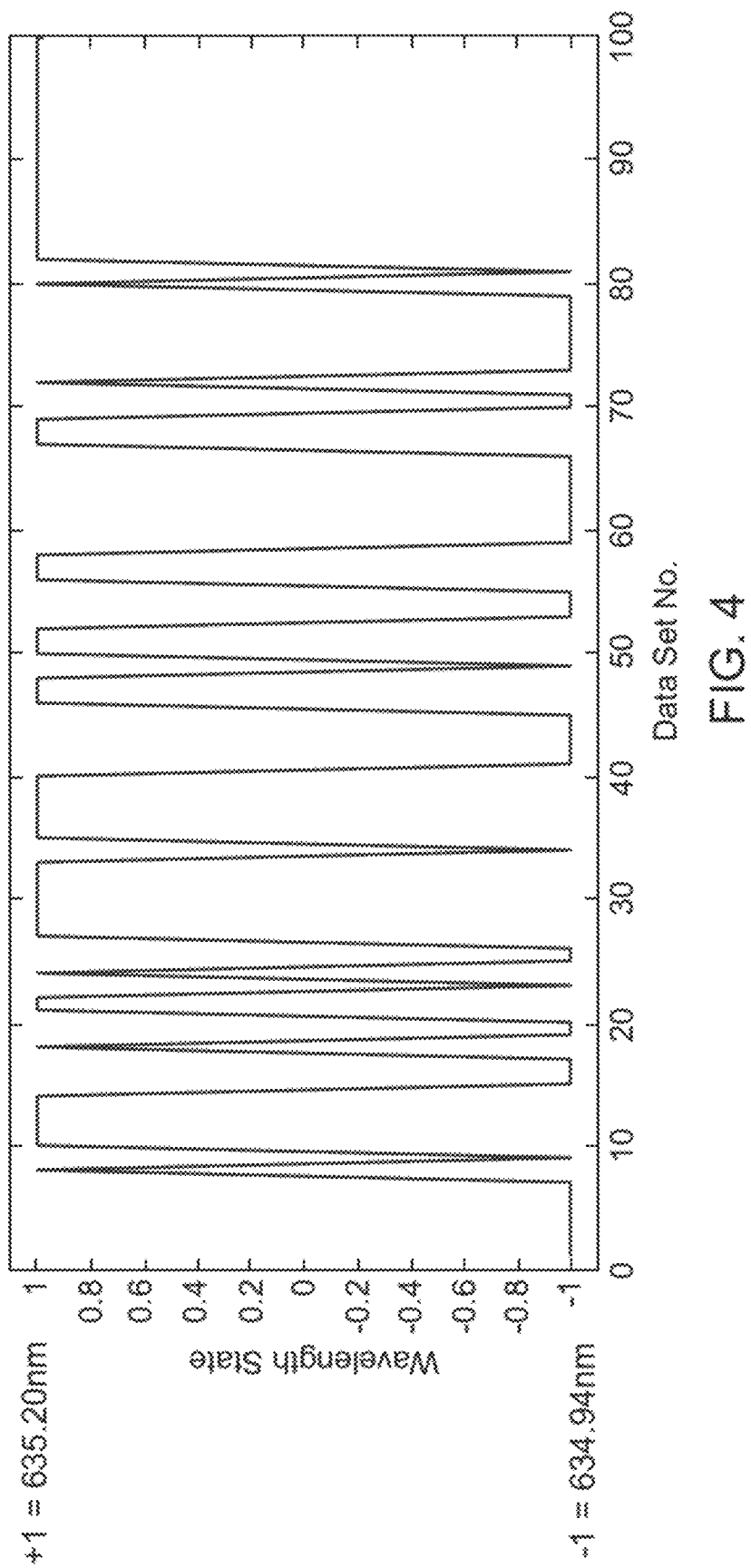
FIG. 4 is a plot illustrating an example excitation sequence between two wavelengths.

To enable multi-wavelength excitation, a modulated input control signal profile can be employed, and can be applied to the Raman excitation source (e.g., the light source 1205), to the modulated component (e.g., the FBG 1215), or to a modulator (e.g., the modulator 1220). Such a control signal, and the resulting modulated excitation can be of any suitable waveform, such as sinusoidal, stochastic, and/or the like. In addition, the excitation source can span any number of input excitation wavelengths between the known and/or predetermined two excitation wavelengths. As an example, modulation between two excitation wavelengths can be accomplished as shown in FIG. 4. For each data set (i.e., emission information/spectrum from the sample, plotted along the horizontal axis) the excitation is set to 635.2 nm (for +1) or 634.92 nm (for −1).

The plot of FIG. 4 can be represented in the matrix form of eq. 1, where each column represents the data set number and its value corresponds to an excitation input value:

$$(I_{\lambda_1} I_{\lambda_2} \ldots I_{\lambda_n}) \quad (1)$$

Figure 5:
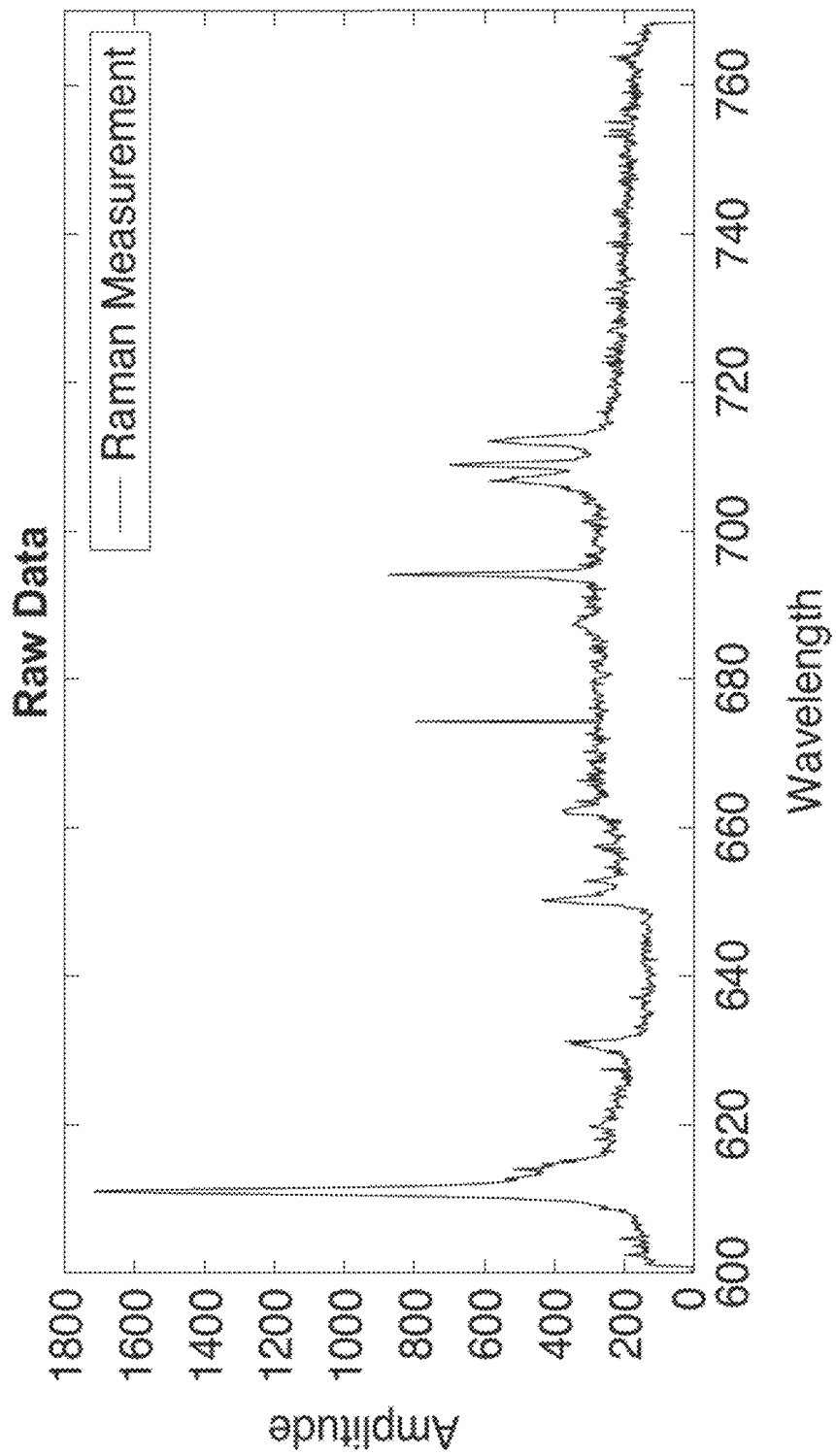
FIG. 5 is a plot illustrating an example response to the excitation sequence of FIG. 4.

As an example, the first input excitation $I_{\lambda 1}$ can correspond to the first input excitation wavelength of 634.94 nm. The output/emission spectrum is shown in FIG. 5 for this example with the CVD diamond sample. The excitation beam (e.g., the portion of the light beam from the source 1205 that impinges on the sample S) and the spectrometer (e.g., the spectrometer 1230) are synchronized, such as via a timing circuit or by the processor 1235 for example, such that the spectrometer integration time matches the length of time in at a given excitation wavelength. In this way, the duration/length of time of each input excitation can match the collection time of the detector/spectrometer.

A matrix is now formed, as shown in eq. 2, that contains the response of each pixel (i.e., the signal at each wavelength, where the signal can include background light, the Raman signal if present, the fluorescent signal if present, etc.) for each input excitation $I_{\lambda n}$. The first column in the matrix in eq. 2 corresponds to the vector plotted in FIG. 5.

$$\begin{pmatrix} \lambda_{11} & \cdots & \lambda_{1n} \\ \vdots & \ddots & \vdots \\ \lambda_{k1} & \cdots & \lambda_{kn} \end{pmatrix} \quad (2)$$

Each column vector in eq. 2 represents the response of the detector for each specific input excitation $I_{\lambda n}$ shown in FIG. 4 and its associated matrix in eq. 1. Each row in eq. 2 represents the time-varying intensity at a specific emission wavelength (i.e., a detector pixel in the spectrometer). The next step is to take the cross-covariance, $\phi_k(\tau)=[1/(N-\tau)]\int_0^N \lambda_k(n) I_{\lambda_k}(n-\tau)$, of each row in eq. 2 with the input of eq. 1. This is shown in the sequence in eq. 3 to obtain a cross-covariance matrix as a measure of similarity between the input and change in amplitude of an individual pixel.

$$\begin{pmatrix} \lambda_{11} & \cdots & \lambda_{1n} \\ \vdots & \ddots & \vdots \\ \lambda_{k1} & \cdots & \lambda_{kn} \end{pmatrix} (I_{\lambda_1} I_{\lambda_2} \ldots I_{\lambda_n}) \rightarrow \begin{pmatrix} \phi_{11} & \cdots & \phi_{1n} \\ \vdots & \ddots & \vdots \\ \phi_{k1} & \cdots & \phi_{kn} \end{pmatrix} \quad (3)$$

Figure 6:
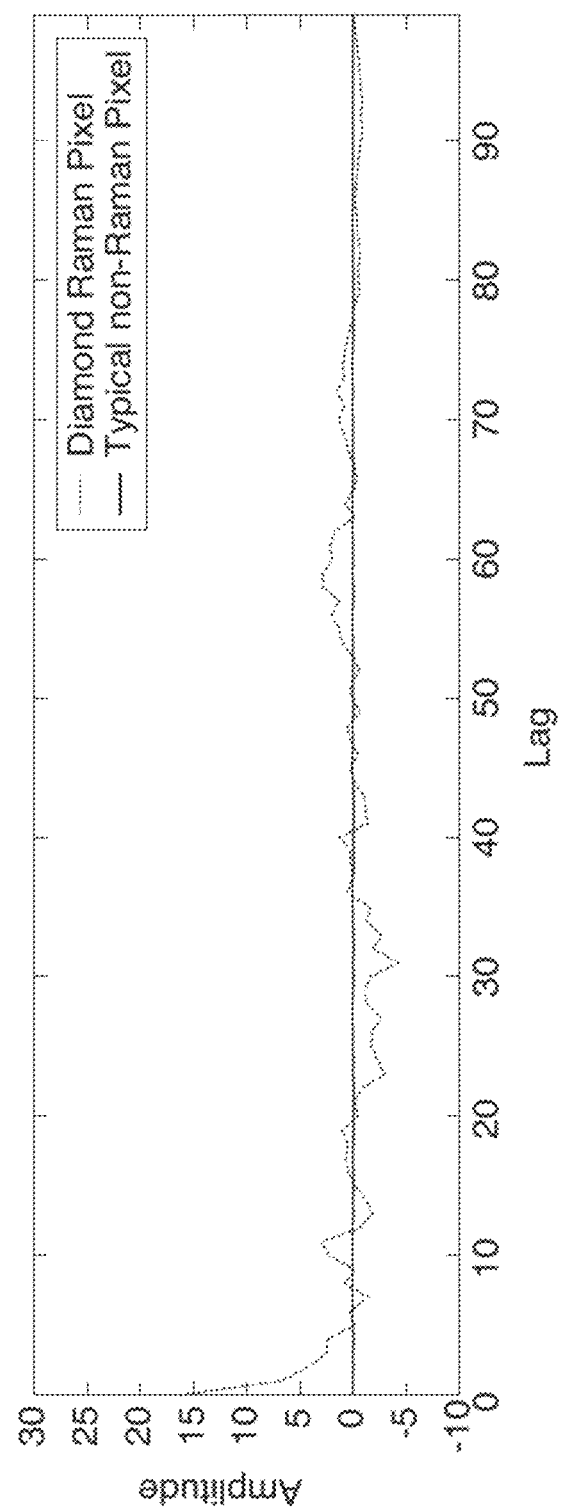
FIG. 6 is a plot illustrating cross covariance between an input and an output/response of a single CCD pixel for Raman scatter and non-Raman scatter.
Figure 7:
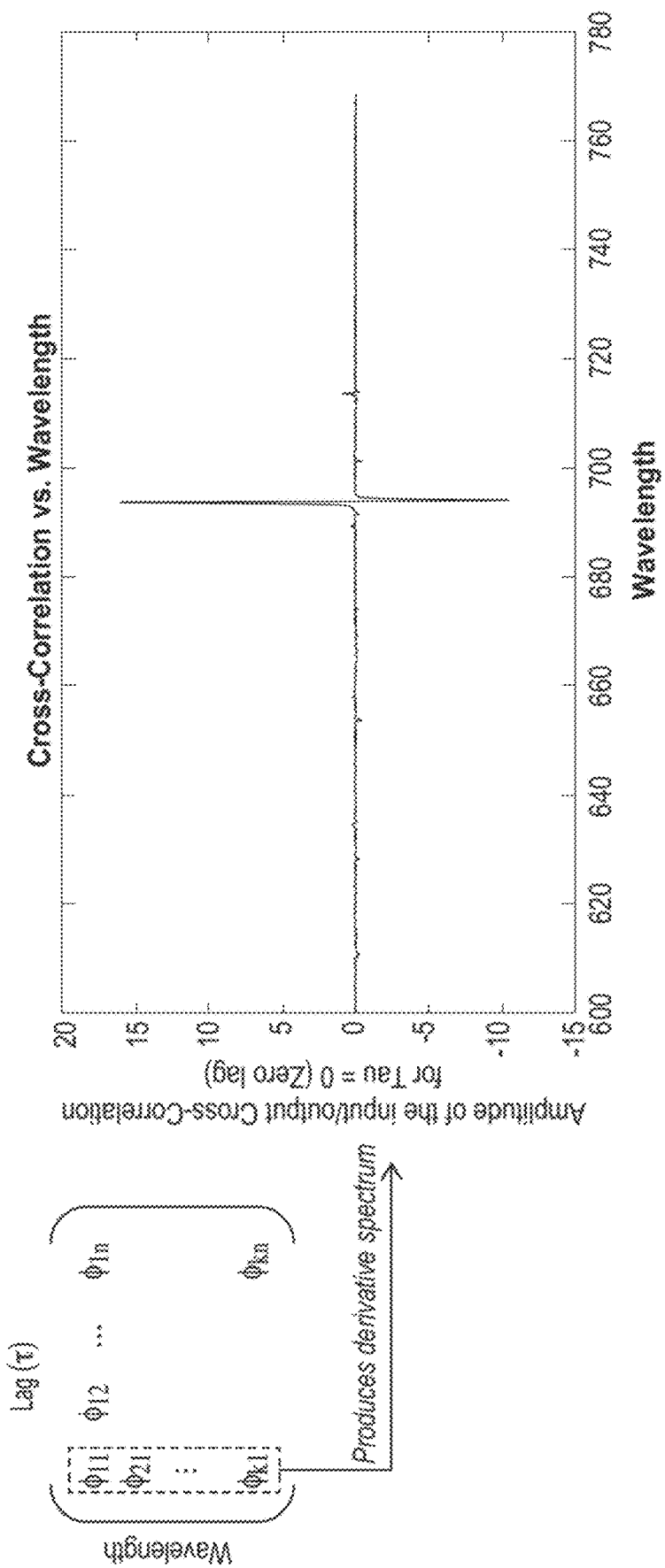
FIG. 7 is a plot illustrating a derivative spectrum obtained through correlation methods.

Each column of the computed cross-covariance matrix "Lag($\tau$)" represents the "lag," and/or lag time, and/or measure of similarity between the wavelength/pixel and input, as one vector is shifted relative to the other. Raman scatter is virtually instantaneous, so the response of those pixels containing Raman scatter photons should have a high correlation that matches the input directly at zero lag time. This value will be either positive or negative depending on whether the Raman scatter increases or decreases in the particular pixel relative to the input. Two types of responses can arise: (1) a response from a pixel containing Raman photons, and (2) a response from a pixel that does not contain or reflect Raman photons. The difference in cross-covariance is shown in FIG. 6, by plotting the response of each type of pixel. The pixel with Raman scatter has the highest correlation with the input excitation at x=0 (zero lag time) and a higher variance across all the lag times due to the finite length of the binary stochastic sequence. Conversely, pixels with no Raman scatter photons have relatively lower correlation values to the input sequence. Plotting the cross covariance at x=0 (zero lag time) along all pixels produces the derivative spectrum of FIG. 7, consistent with the more conventional direct subtraction approach.

Improvement over Conventional Approaches

The approach outlined here has a number of significant improvements over the subtraction of data sets in conventional SERDS. In SERDS, one measurement is conducted at one excitation wavelength. This first measurement contains a combination of Raman scatter, fluorescence, and background artifacts. A second measurement is taken at another excitation wavelength. Subtraction of the two data sets leaves features that predominantly resemble the derivative of the Raman signal. However, a number of assumptions need to be made to obtain reliable derivative spectra. One assumption is that the excitation shift is small enough that Kasha's rule applies. This means that small shifts in excitation leave the fluorescence spectrum relatively unchanged. Another assumption is that the input excitation shift is reliable and can be accurately predicted. Any deviation from the two excitation states in conventional SERDS degrades the quality of the output once the spectrum is subtracted. This may be a relatively small problem when working in a controlled environment, but for compact system in the field subject to harsh conditions it may be more complicated.

Benefits of the systems and approaches detailed herein include operating at higher Signal-to-Noise Ratios (SNRs) for a given pump power or integration time. The cross-covariance matrix contains additional information specific to the cross-covariance method that can be used to increase the SNR. The first column produces the derivative spectrum and the other columns represent under-utilized information. This is shown in the matrix in eq. 4:

$$\begin{pmatrix} \phi_{11} & \cdots & \phi_{1n} \\ \vdots & \ddots & \vdots \\ \phi_{k1} & \cdots & \phi_{kn} \end{pmatrix} \quad (4)$$

Figure 8:
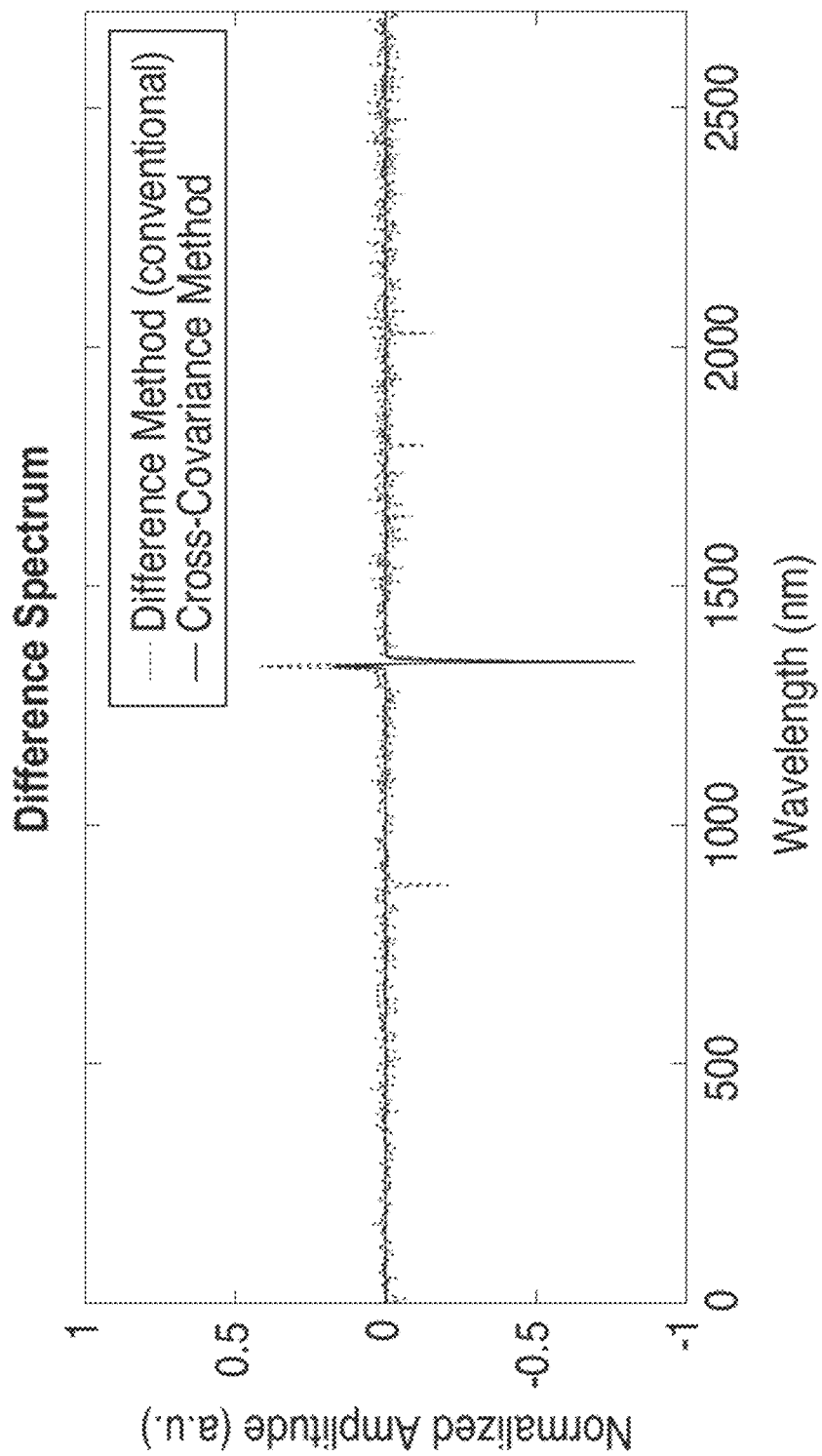
FIG. 8 is a plot illustrating calculation of a difference spectrum using both a conventional difference method and a cross-covariance method.

Without being bound by any theory in particular, additional information regarding the level of similarity between the two vectors at different points in time or lag are evident. Even though the input sequence is stochastic, it is both binary and finite in length, which leads to other lag positions where correlation exists for Raman scattered wavelengths. Conversely, this characteristic feature is not apparent at wavelengths with no Raman scattering photons, In this manner, by scaling the derivative spectrum, by the amount of variance in each row, one can obtain a derivative spectrum, such as the plot of FIG. 8, with a relatively higher SNR as compared to traditional approaches. Such approaches account for the redundancy in the cross-covariance due to the finite length of the binary stochastic sequence and utilize this information to provide a higher fidelity derivative spectrum.

Figure 9:
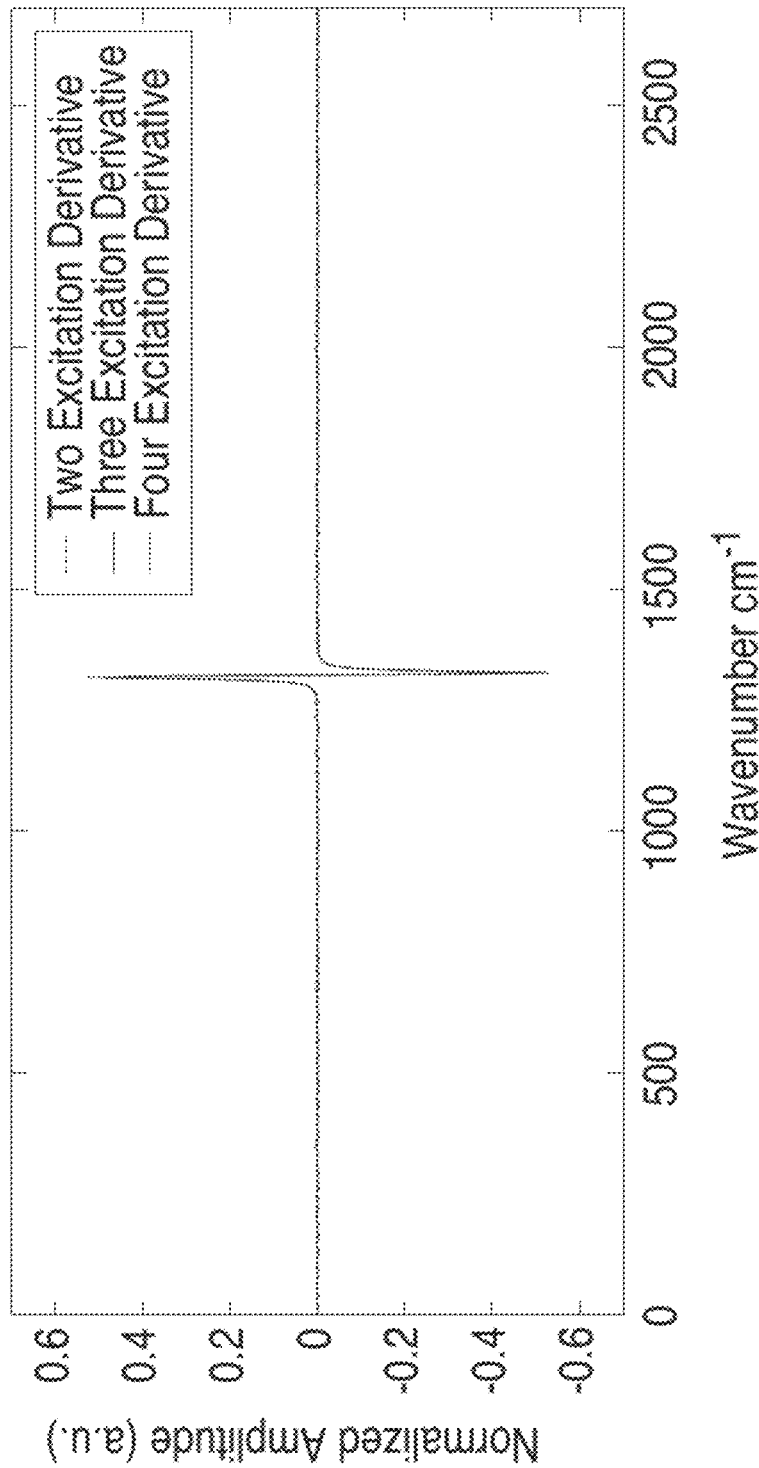
FIG. 9 is a plot illustrating a multi-excitation derivative spectrum.
Figures 10A, 10B:
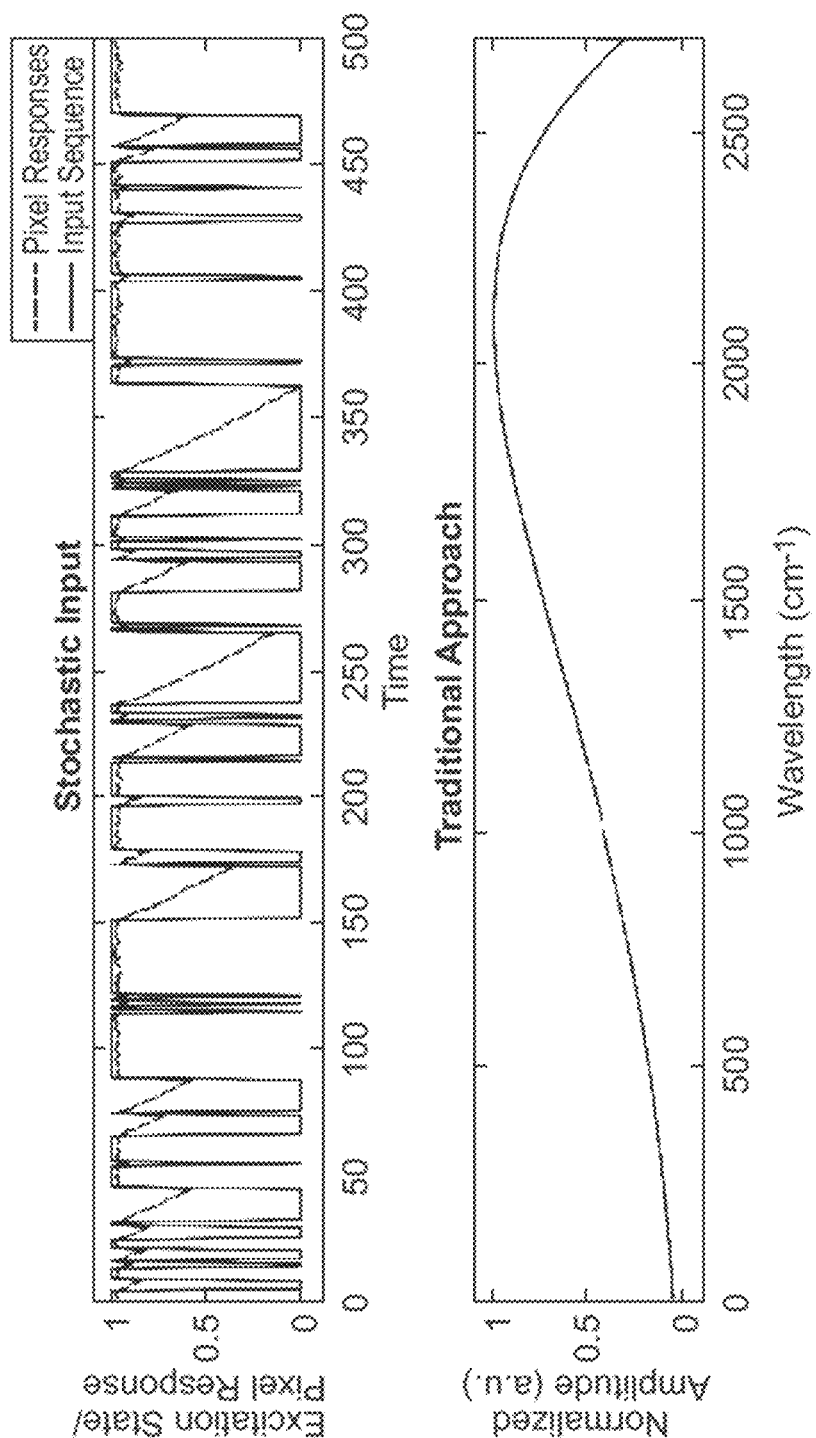
FIG. 10A illustrates a stochastic excitation sequence between two wavelengths (input sequence) and a normalized detector response at a discrete wavelength (pixel response), where the stochastic excitation sequence is modulating faster than the fluorescence or phosphorescence decay time and saturating the Raman scatter signature.
FIG. 10B illustrates the difference spectrum computed using the conventional difference method for a given sampling rate and duration for the example response shown in FIG. 10A.
Figures 10C, 10D:
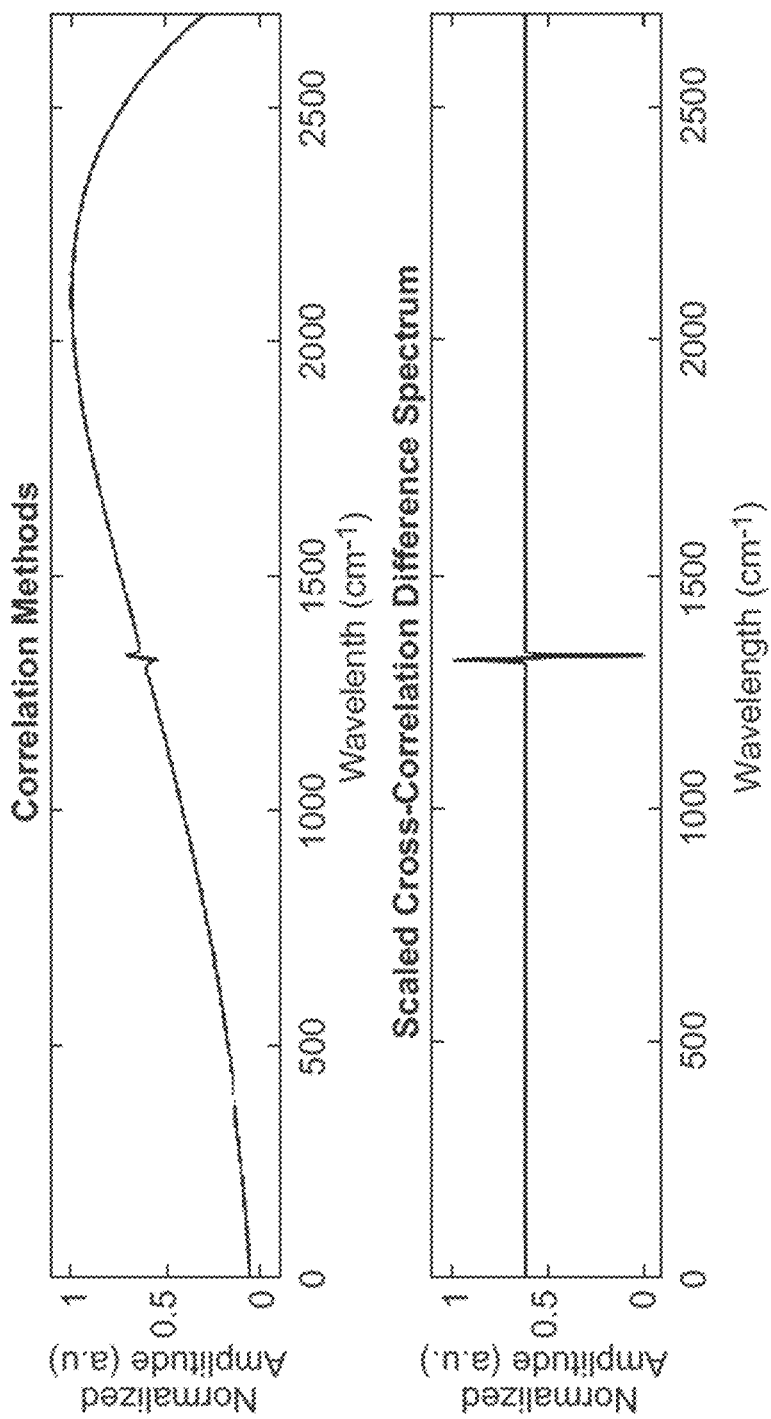
FIG. 10C illustrates the difference spectrum computed using the cross-covariance method for a given sampling rate and duration for the example response shown in FIG. 10A.
FIG. 10D illustrates the difference spectrum computed using the cross-covariance method for a given sampling rate and duration for the example response shown in FIG. 10A and scaled by a factor that accounts for the redundancy in the cross-covariance due to the finite length of the binary stochastic sequence.

Another improvement is the increased robustness of the Raman measurement. In traditional approaches, any overshot or environmental effects that may slightly shift the excitation frequency are usually averaged. This leads to an increase in flicker noise. Yet, the systems and methods disclosed herein are insensitive to these effects as long as the input is known for small wavelength shift. Indeed, the derivative spectrum can be obtained from any arbitrary number of shifts. This is shown in the (simulated) derivative spectra illustrated in FIG. 9 for two, three, and four different input excitation wavelengths.

Yet another improvement is operation outside the bounds of Kasha's rule. Variable excitation techniques have traditionally been applied in the near-infrared (NIR) where small changes in excitations have little effect on the fluorescence spectrum. Because Raman scatter scales by $1/\lambda^4$, reducing the input excitation wavelength would increases the Raman signal. Relatively greater energy is present at shorter excitation wavelengths, so there may be cases where Kasha's rule does not apply. At longer wavelengths, smaller shifts in wavelength are less likely to excite photons to higher electronic states. These shorter excitation wavelengths have a greater impact on the fluorescence spectrum for a given shift, thus overcoming Kasha's rule as applied to shifted excitation techniques in Raman spectroscopy. In some cases, shorter wavelengths can be employed but without breaking Kasha's rule.

The approaches described herein have the added benefit that they can mask out any effects that are delayed in time, like changes in fluorescence. If the wavelength modulation occurs at a frequency faster than the fluorescence excitation or decay then there should be little correlation, which effectively masks the effects of changes in fluorescence. This is shown in FIGS. 10A-10D, where the excitation wavelength changes faster than the fluorescence decay time. In the traditional approach, the system must stabilize at each input excitation wavelength independently before measurements are made. In such approaches, changes in fluorescence over different excitation wavelengths must be accounted for, making them impractical for application in shorter wavelength (higher energy) variable excitation Raman systems, as explained above.

A Stochastically Modulated Multiplexed Raman Spectrometer for High Throughput Chemical Analysis Disclosed herein are configurations for high throughput analysis (e.g., chemical analysis across multiple samples) using Raman Spectroscopy, and can be useful in any variable excitation Raman spectroscopy system, including the system of FIG. 12 described above. Raman spectroscopy provides detailed chemical information through unique molecular vibrations when excited by an incident laser. The high specificity provides the ability to monitor chemical/biological reactions or analyze the makeup of a sample. Yet, the implementation of this technique has been limited to point measurements or localized 2D imaging-type Raman systems. Disclosed herein are systems and methods based on (a) multiplexing and stochastically modulating the excitation source with the use of a single dispersive element, and (b) a multichannel spectrometer, to obtain a derivative spectrum. Such systems and techniques take advantage of the nearly instantaneous Raman response that is proportional to the input excitation and isolates it from other features like fluorescence, that have longer lifetimes and are nearly constant over small changes in input excitation.

Figure 16:
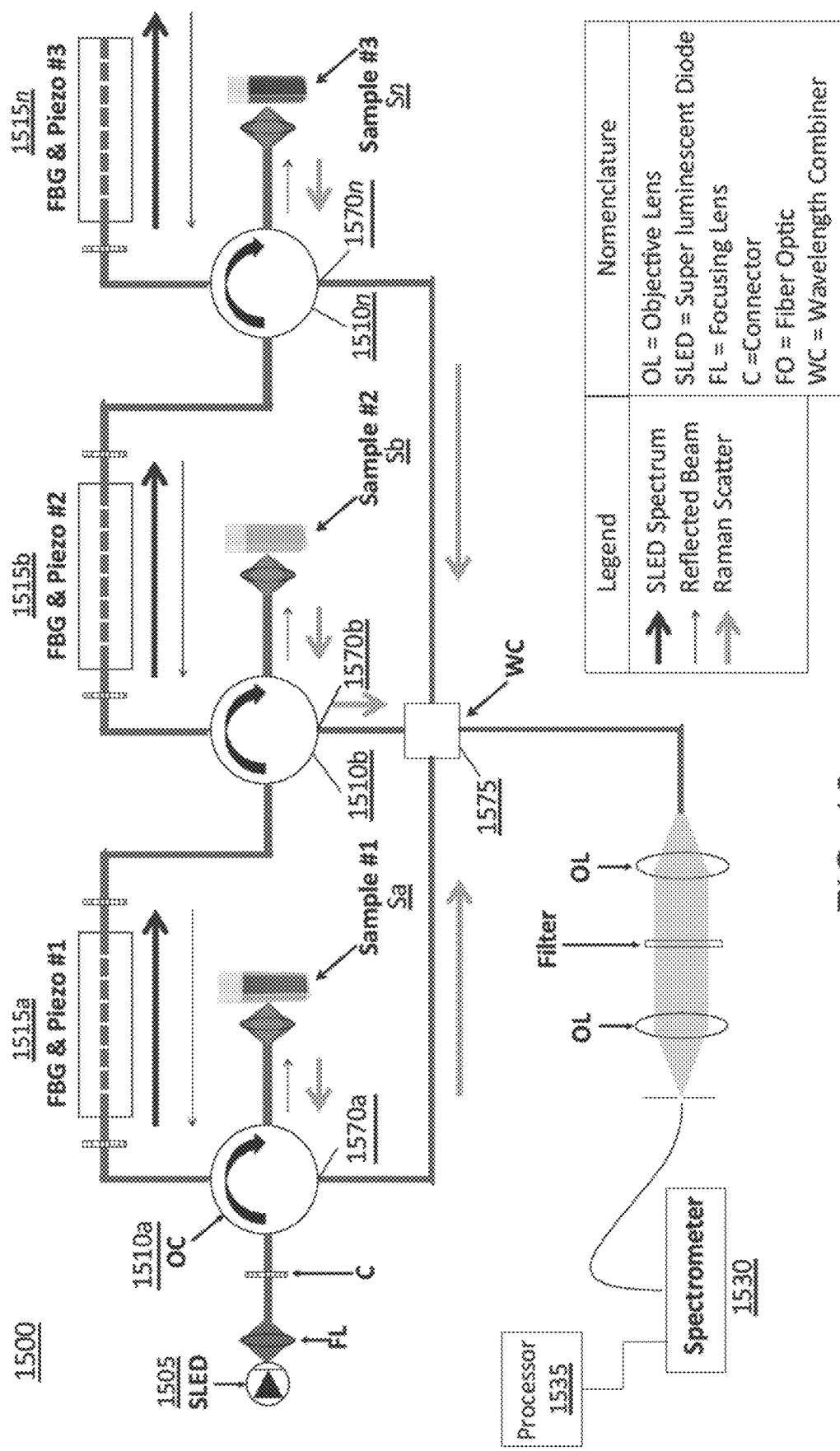
FIG. 16 illustrates a system for multiplexed variable excitation Raman spectroscopy.

FIG. 16 illustrates a system 1500 based on a stochastically modulated, multiplexed approach. The system 1500 is standardized to a single laser, sample, and detector and can make many measurements in parallel. Unless noted otherwise, the components of FIG. 16 can be structurally and/or functionally similar to similarly named and referenced components in FIG. 12 such as, for example, the light source 1205 and the light source 1505.

The system 1500 includes a light source 1505, such as a single SLED, that provides a light beam with a relatively broad spectrum. Similar to the light source 1205, this light beam is passed to a four-port optical circulator 1510a, which can be a first optical circulator of n optical circulators, referenced as circulators 1510a, 1510b, . . . 1510n. The circulator 1515a transmits this light beam to a first FBGs 1515a of multiple FBGs 1515a, 1515b, . . . 1515n (each indicated as included both the FBG and a corresponding piezoelectric modulator). A portion of the beam at a first wavelength is back reflected by the first FBG 1515a, and passes back through the first circulator to a first sample Sa. A remaining portion of the beam is transmitted by the first FBG 1515a, and serves as an input beam to the second optical circulator 1510b, which in turn transmits a portion of that input beam to its corresponding FBG 1510b, and so on. The second FBG 1515b is configured to reflect a portion of its incident beam at a second wavelength that is different than the first wavelength, and this reflected portion is transmitted to a second sample Sb through the second optical circulator 1510b, and so on. The nth/terminal FBG 1515n can reflect a portion of its incident beam at a third wavelength different than the first and second wavelengths through a third circulator to Sample Sn.

In this backscatter configuration, the Raman scatter from each sample Sa, Sb, . . . Sn returns to its corresponding optical circulator via the same fiber than delivers its Raman pump beam, and exits its corresponding optical circulator at the fourth port 1570a, 1570b, 1570n of that optical circulator, and into a spectrometer 1530. An optical multiplexer circuit 1575 can be employed to combine the emissions signals from the ports 1570a, 1570b, 1570n. Any suitable optical multiplexer can be used such as, for example, a multi-wavelength, single-mode wavelength division multiplexer (WDM).

Figure 17:
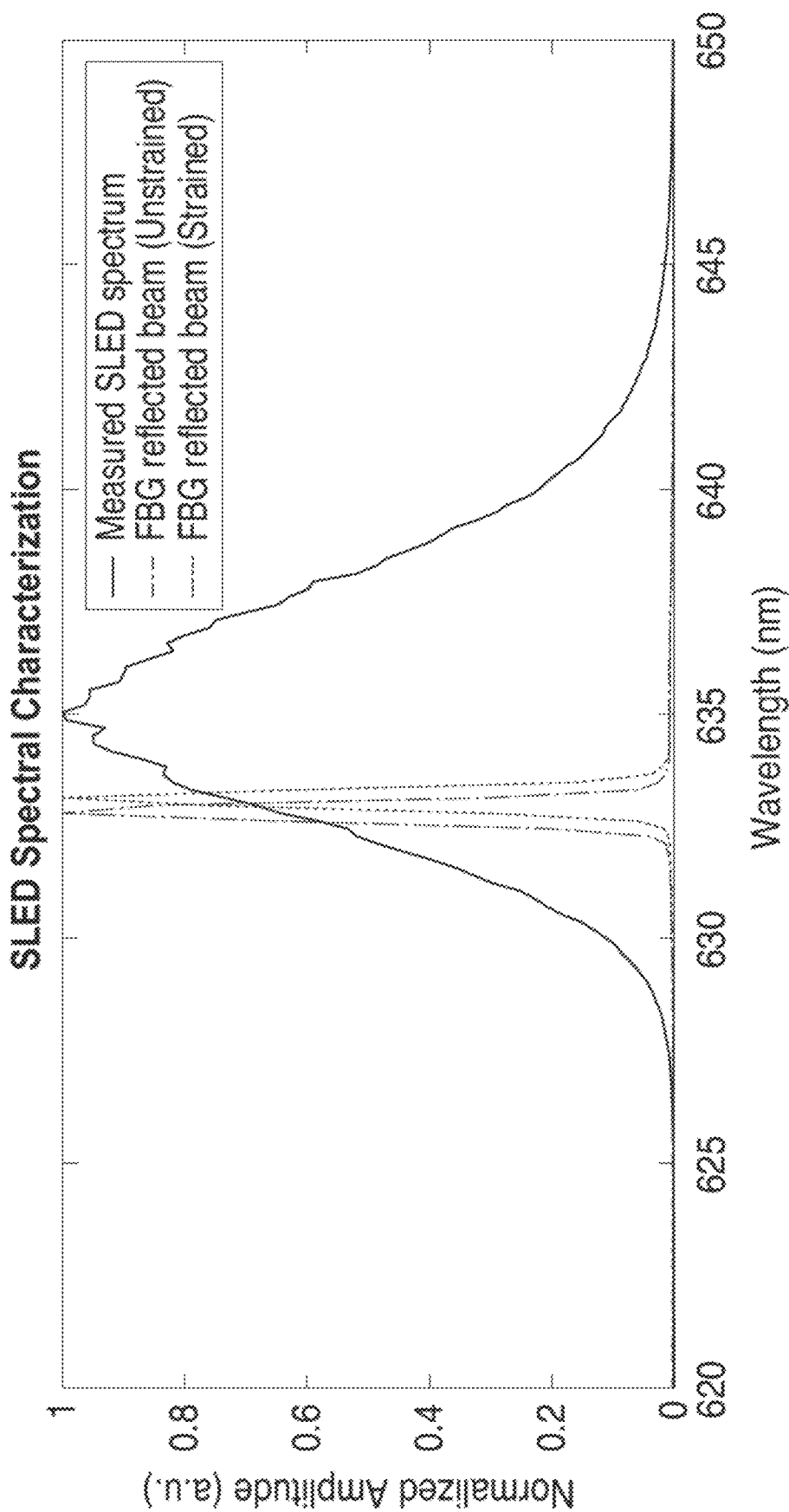
FIG. 17 is a plot illustrating a spectral profile of a super luminescent diode (SLED).
Figure 18:
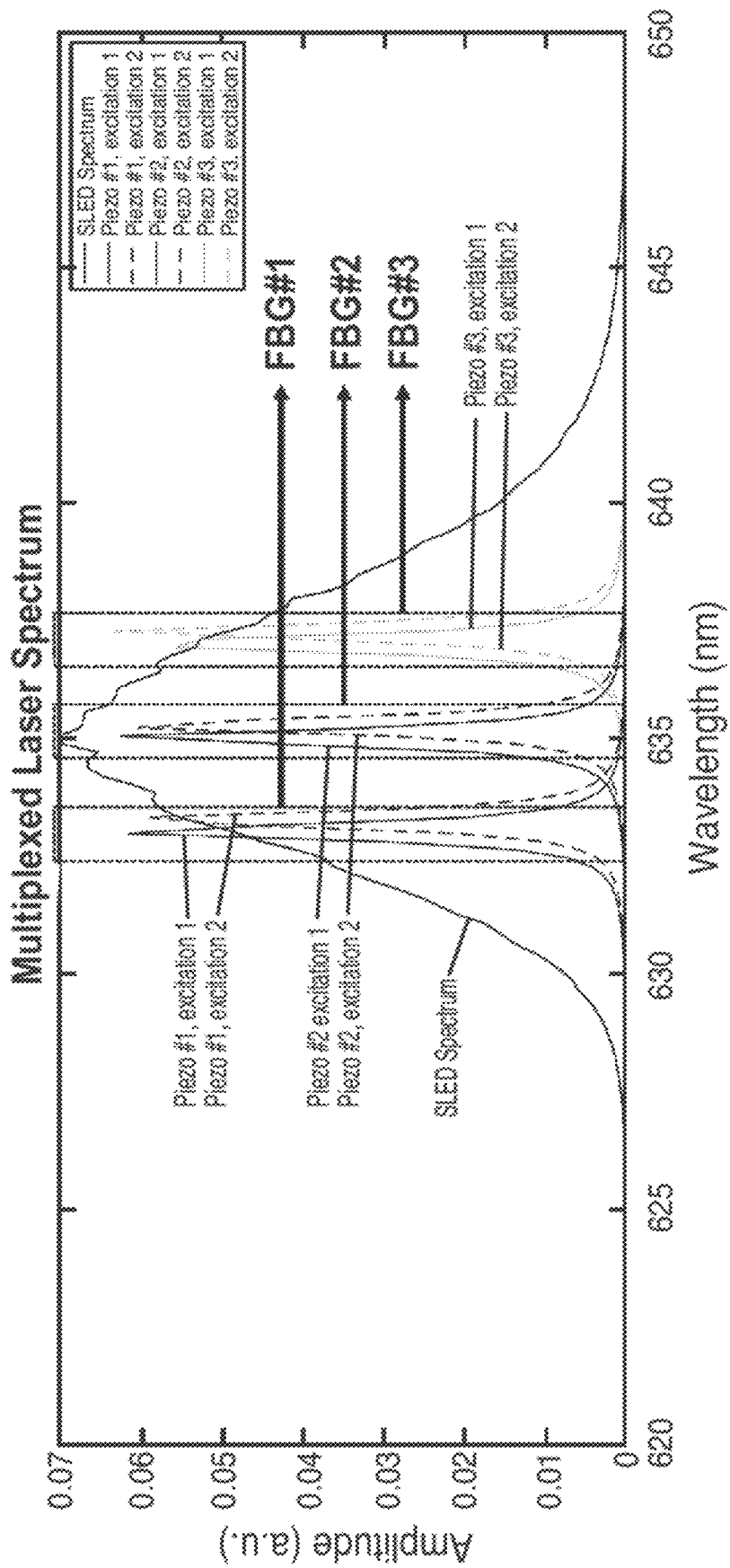
FIG. 18 is a plot illustrating how FBGs in the system of FIG. 16 can be employed to isolate different portions of the emission spectrum of a SLED.

As an example, a SLED was characterized using an FBG by both measuring the spectrum of the light beam from the SLED with a spectrometer, and then measured the spectrum of the same light beam after it was filtered through the FBG, i.e., of the reflected portion of the light beam. The SLED spectrum is shown in FIG. 17 along with the narrow reflected spectra when it is passed through an FBG, both in the strained and unstrained conditions. The bandwidth of the reflected beam is significantly narrower than shown in FIG. 17 as the detector resolution is limited to 0.25 nm per pixel. An interrogator was used to measure the FWHM of the FBG with higher resolution and found a FWHM of approximately 25 pm. Based on the strain sensitivity of the FBG and maximum strain applied, the dynamic range is approximately 5 nm. Therefore, the piezo can be used to appropriately bias the FBG. The boxed sections in FIG. 18 show the regions of the spectrum that could be isolated with multiplexed FBGs. Accordingly, while FIG. 16 shows three optical subsystems, each with its own optical circulator/FBG combination, n number of such subsystems may be employed, of which circulator/piezo/FBG combinations in series, three of which are shown in FIG. 18. The dashed lines in FIG. 18 represent the "modulated position", or small shift in the spectrum of the back reflected beam when an FBG is strained.

Some variations of the system 1500, for purposes of generating different input beams for different samples, can include multiple laser diodes in parallel. Each diode may be temperature controlled independently to generate a stochastic input. Another possibility is the use of multiple tunable lasers whose wavelengths may overlap, but can be modulated stochastically relative to one another. Other variants capable of modulating the laser input include the use of Distributed Bragg Reflectors (DBR), Distributed Feedback (DFB) Lasers, and Vertical Cavity Surface Emitting Lasers (VCSELs).

For each implementation, generally, a unique stochastic signal may be generated for each input light source/laser, for each FBG, and/or for each piezoelectric actuator. In the example system 1500, the first piezoelectric actuator can modulate the first FBG (collectively, 1515a) stochastically to produce a first excitation beam that varies between two wavelengths. A separate and unique stochastic input can be provided to the second piezoelectric actuator to modulate its FBG (collectively, 1515b) to shift the excitation wavelength for the second sample Sb to between two different wavelengths, and so on for an arbitrary number of n optical subsystems.

Figure 19A:
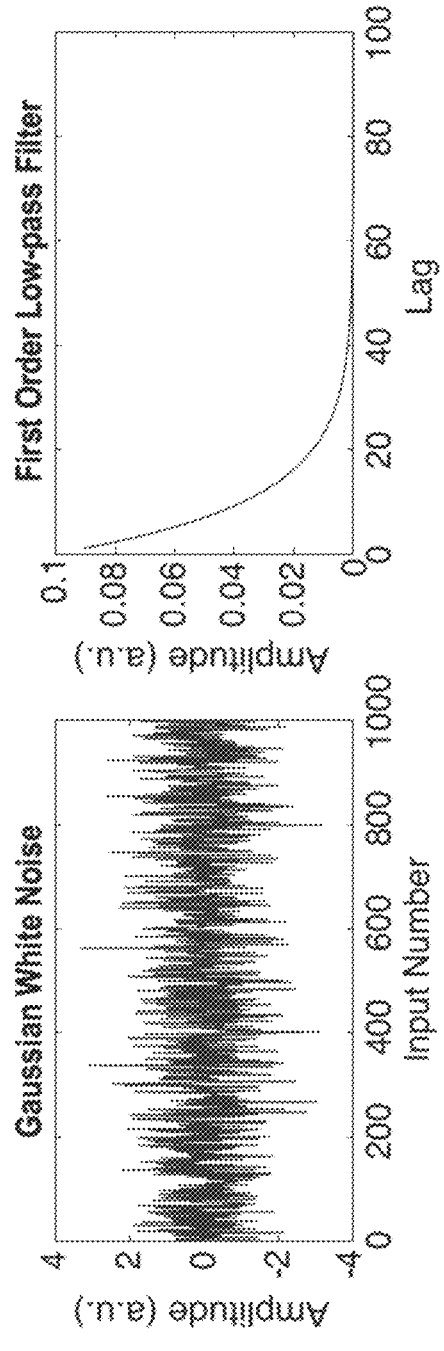
FIG. 19A is a plot illustrating example Gaussian white noise.
Figure 19B:
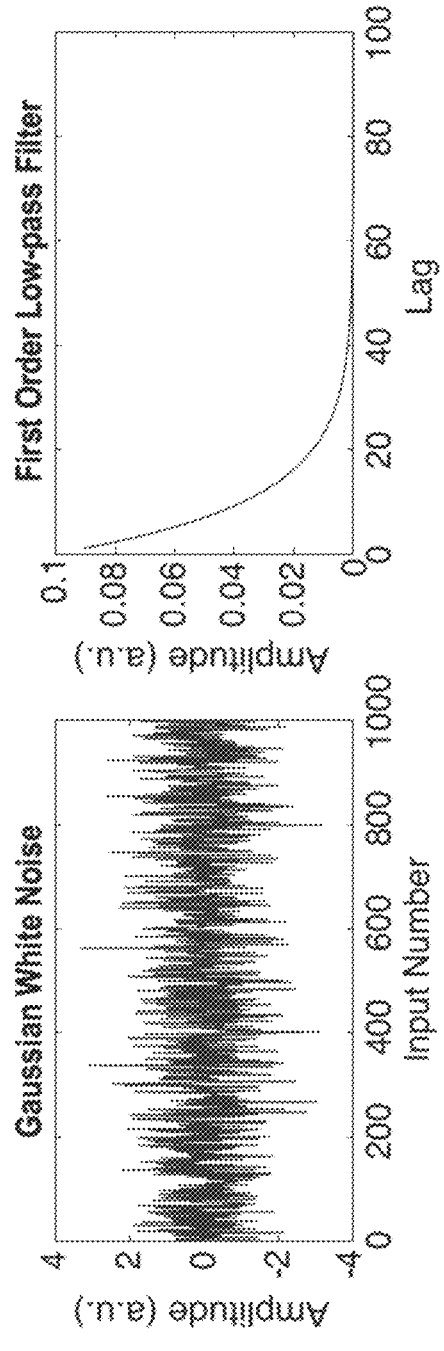
FIG. 19B is a plot illustrating a response of a first-order low-pass filter.
Figure 19C:
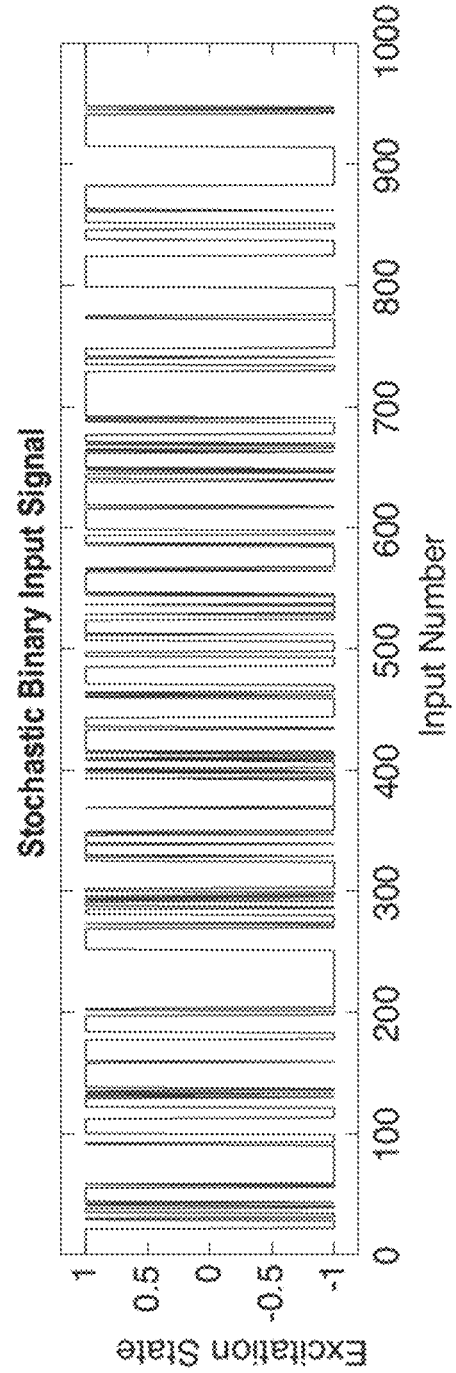
FIG. 19C illustrates a stochastic, binary input signal based on the Gaussian white noise of FIG. 19A and the filter characteristics illustrated in FIG. 19B.

A stochastic input or control signal, such as illustrated in FIG. 19C, can be generated by convolving Gaussian white noise (see FIG. 19A) with a first-order low-pass filter (see FIG. 19B) and setting the result between −1 and +1 using a thresholding technique. The assigned state of +1 can correspond to one arbitrary input excitation wavelength and −1 corresponds to another input excitation wavelength that is separated by a small amount that depends on the sample, spectrometer pixel resolution, and light source characteristics. While described here for binary states, other states such as tertiary, etc. can also be employed. In some case, any arbitrary stochastic sequence can be generated and employed.

Figure 20:
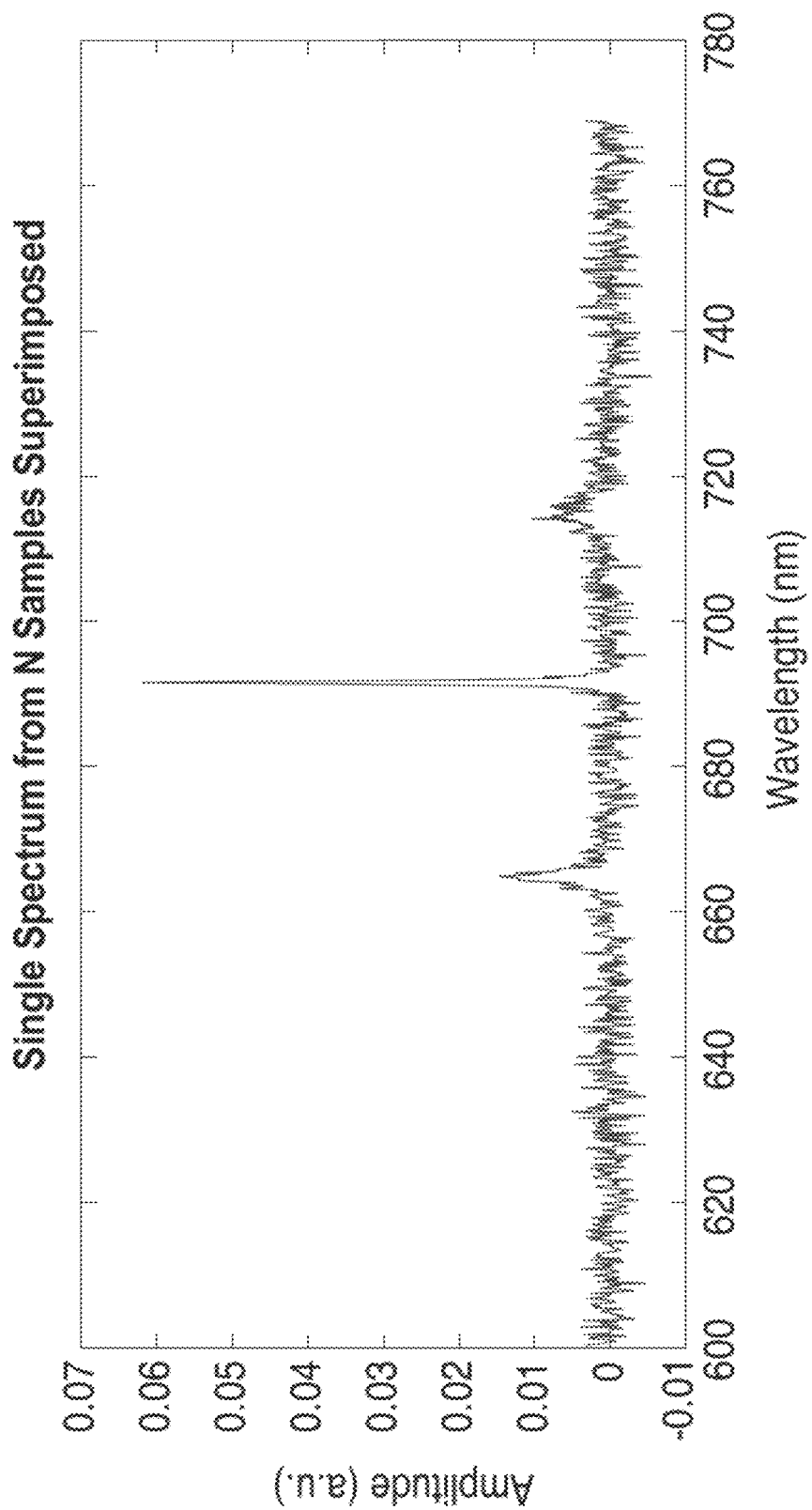
FIG. 20 is a plot illustrating the superposition of Raman scatter from three different samples as captured by the spectrometer in the system of FIG. 16.

The stochastic input to the piezoelectric actuators of 1515a, 1515b, . . . 1515n can have little or no correlation to one another. The system 1500 can be synchronized, such that the integration time of the spectrometer 1530 can match the length of time in a given excitation state. Therefore, a dataset generated by the spectrometer 1530 can include a superposition of emission data from all the samples Sa, Sb, . . . Sn. As an example, FIG. 20, shows a single data set from the spectrometer 1530 with the superposition of Raman scatter from three different samples (consistent with the setup in FIG. 16).

Figure 21:
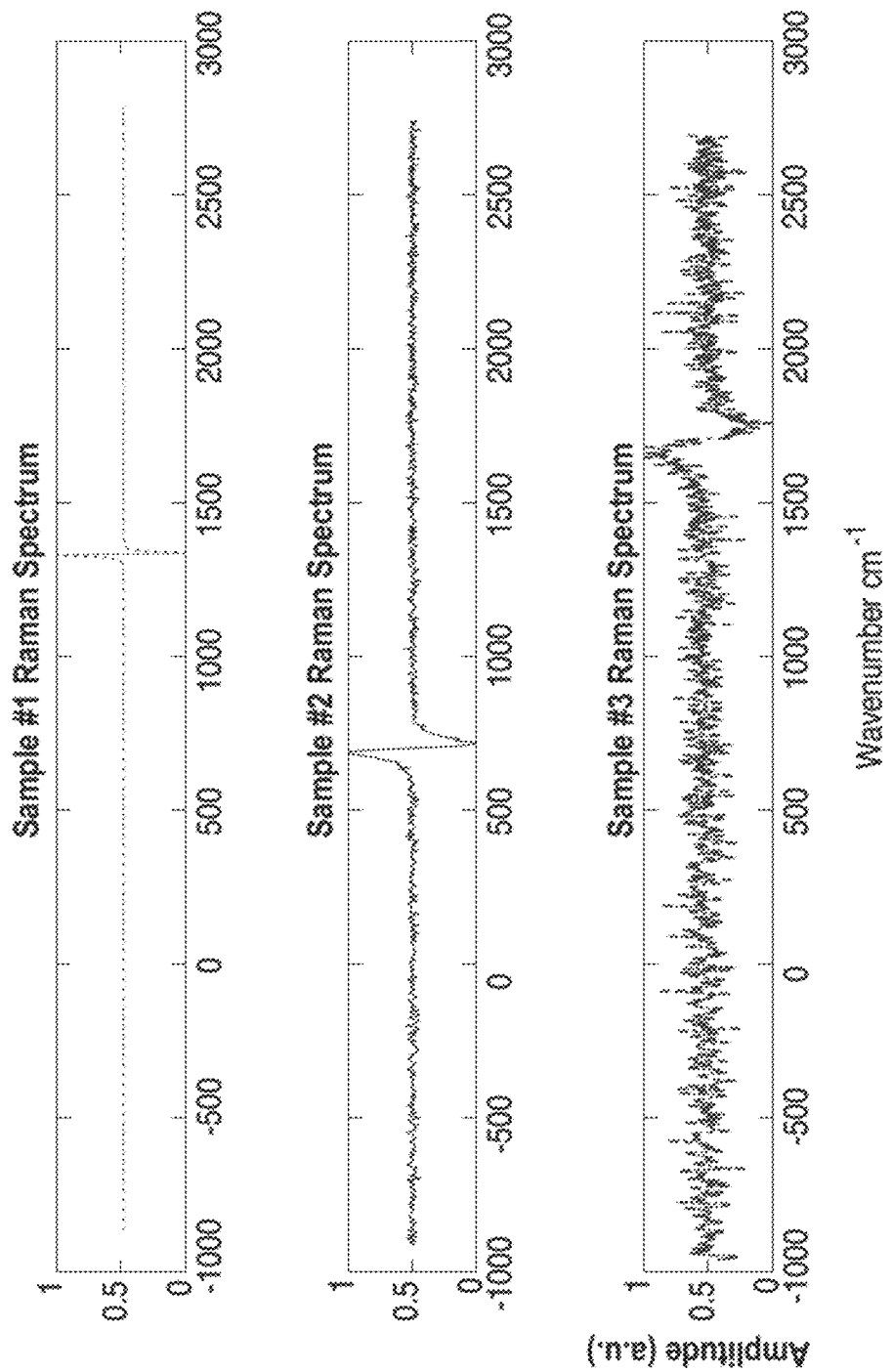
FIG. 21 shows plots of individual Raman spectra isolated from the plot of FIG. 20, with each plot illustrating the Raman spectrum of a different one of the three samples.

In order to filter out the spectrum and obtain the derivative feature that is associated with each sample Sa, Sb, . . . Sn, the unique stochastic input from each sample is cross-correlated with the response of a single pixel. Pixels that are well correlated to the stochastic sequence will have a high correlation value (either positive or negative), thus producing a derivative spectrum that is commonly seen in shifted excitation techniques in Raman spectroscopy. When each modulator has a unique stochastic input, the cross correlation discriminates outputs from different samples. The cross covariance (mean subtracted correlation) provides an equivalent result. This technique, when applied to the data in FIG. 20, isolates the Raman responses of the individual samples. The results are shown in FIG. 21, with each derivative-like feature successfully isolated from each sample using a single detector and respective modulated inputs.

Existing devices cannot perform Raman measurements on multiple samples (e.g., samples in different wells of a multi-well plate) simultaneously with a single detector. Therefore, systems such as the system 1500 provide a fundamentally new setup that drives down the cost of implementing a high throughput Raman detection system. Many samples can be recorded and analyzed simultaneously as compared to point measurement or localized 2D systems. This opens up significant opportunities in drug development and other fields where rapid iterations are desired.

Applications

Systems and method described here are applicable to any Raman sensing systems, devices, and methods, including portable Raman sensors. These approaches can be incorporated into other types of Raman systems, including Surface Enhanced Raman Spectroscopy (SERS) or Tip Enhanced Raman Spectroscopy (TERS) systems, among many others. Example 1 details the use of stochastically modulated, multiplexed Raman Spectrometers to Surface Enhanced Raman Spectroscopy (SERS), as disclosed in more detail in the Example.

As another application, drug development is a long, arduous process that involves extensive clinical research to ensure that the drug is safe and effective. The use of a Raman-based chemical and biological detection system such as those described here has the potential to expedite the research period through active monitoring of interactions. It is impractical to have an array of Raman Spectrometers, that can cost over $20,000 each, for each single device. The technology disclosed here significantly eliminates the need to have multiple spectrometers, which is typically the costliest item in a Raman spectrometer setup.

As yet another application, the food processing industry is highly regulated and could benefit from advanced, Raman-based detection capabilities of trace substances, like mycotoxins or allergenic proteins. This could reduce the spread of disease or the accidental cross contamination of products that could lead to allergic reactions in certain individuals. As yet another application, forensic science could benefit greatly from improved analysis of chemical and biological substances to provide evidence in investigations.

As yet another application, chemical and biological detection and identification has become increasingly important for military and government applications. One example is the rapid spread of counterfeit medicines that can pose a significant health risk. In the United States, the Food & Drug Administration (FDA) works with other government agencies and companies to prevent the spread of counterfeit medicines. Development of detection techniques will support the agencies mission and help to prevent the spread of these illegal drugs.

Yet another application is the detection of explosive materials to counter the growing threat of global terrorism. These materials can be in the form of airborne aerosols or solid chemical composition. The Joint Science and Technology Office for Chemical and Biological Defense (JSTO-CBD) has identified the need for the next generation of chemical sensor technology, where such systems could find application. Application in the space of wearable sensors is possible as well, since fiber based technology can be compact. The systems and methods described here have the requisite specificity and sensitivity to differentiate and identify targeted molecules, chemicals, or biological samples. Miniaturized, wearable form versions of these systems and methods can find use in understanding airborne disease propagation and in contact tracing.

Example 1

Aspects of the hardware and signal processing described herein are developed, tested and evaluated. This example starts with a discussion on integrating and synchronizing all the system components. It is followed by a discussion of the application of shifted excitation techniques in SERS and a showing of some experimental results.

System Integration

Figure 22:
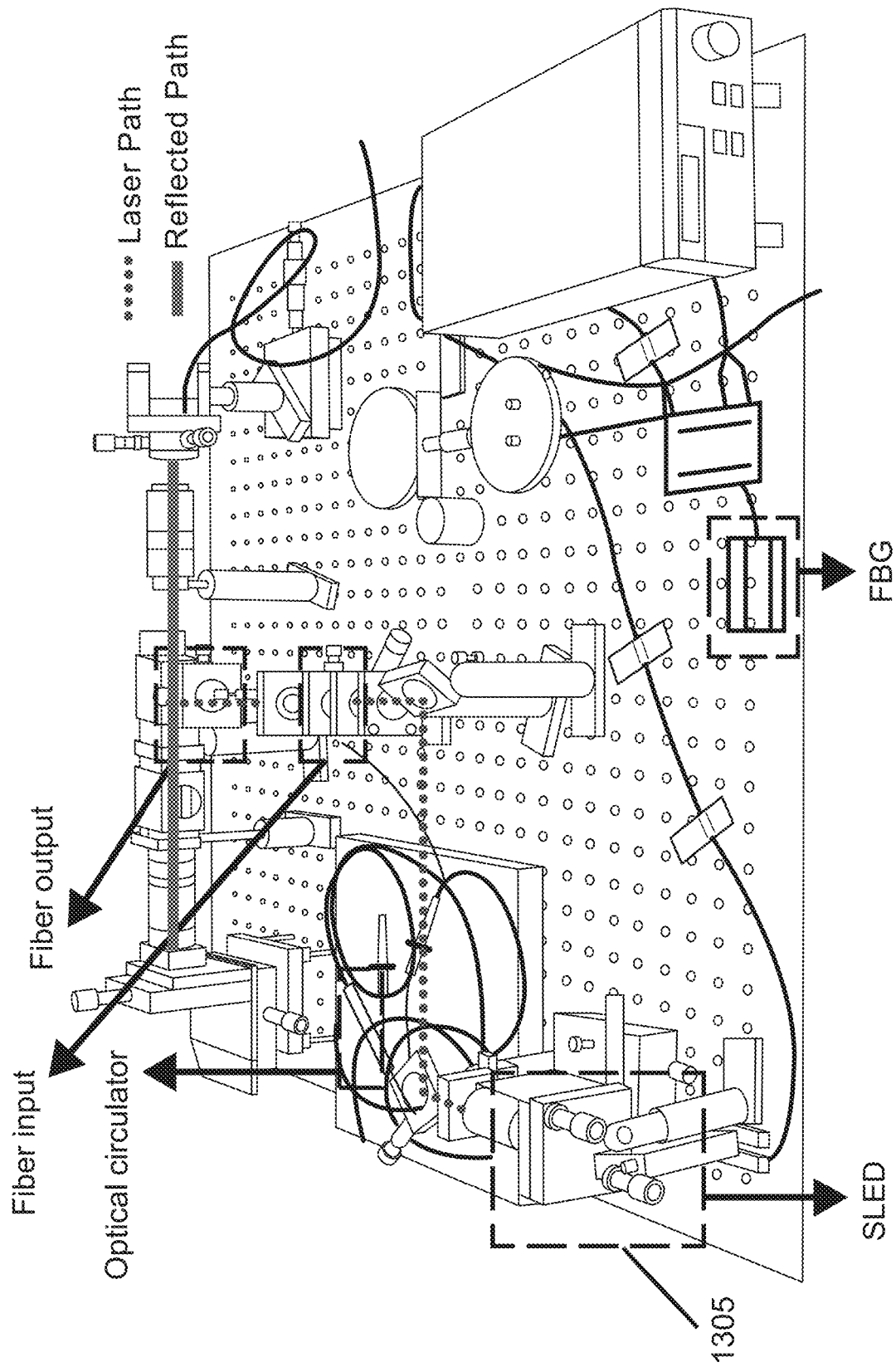
FIG. 22 shows an example hardware configuration for a system for Raman spectroscopy.

An example hardware system setup is shown in FIG. 22 with all the components integrated. The SLED was collimated using an objective lens and a combination of tip/tilt stages. The collimated light source was aligned into a single-mode fiber using two mirrors. Then, the single-mode fiber was connected to the input port of the optical circulator. The optical circulator output (i.e. the second port) was connected to the FBG. The FBG reflects a narrow portion of the beam, which reenters the optical circulator through the second port, and exits through a third port. The third port of the optical circulator was connected to a collimating lens, which collimates the narrow reflected beam to a diameter of approximately 2.8 mm. The beam was reflected off the dichroic beam splitter into an objective lens that has a matching entrance diameter. A sample placed at a working distance of 6 mm from the lens was illuminated, and backscattered light was collected. The backscattered light contained both Rayleigh and Raman scattered photons. A small portion of the Rayleigh scattered photons were filtered through the dichroic and the remainder were filtered through the long-pass filter following the dichroic. Conversely, the wavelength-shifted Raman scattered light passed through the dichroic and the long-pass filter and was focused onto a multimode fiber core of about 50 µm. The fiber was connected to the spectrometer for analysis.

The mechanical fiber stretcher is still intact in FIG. 22. Also, the output of the FBG was connected to a power meter. This can be better seen in FIG. 23, where the system was operational and the light loss through the fibers is visible. The portion of the beam that is not reflected, but rather filtered through the FBG, was constantly monitored. This provided an opportunity to ensure the following: (1) that the SLED was stable, meaning that the fluctuations in power were minimal and (2) that the alignment was maintained by observing any large dips or drift in the power over time. The system was stabilized prior to each test.

Figure 23:
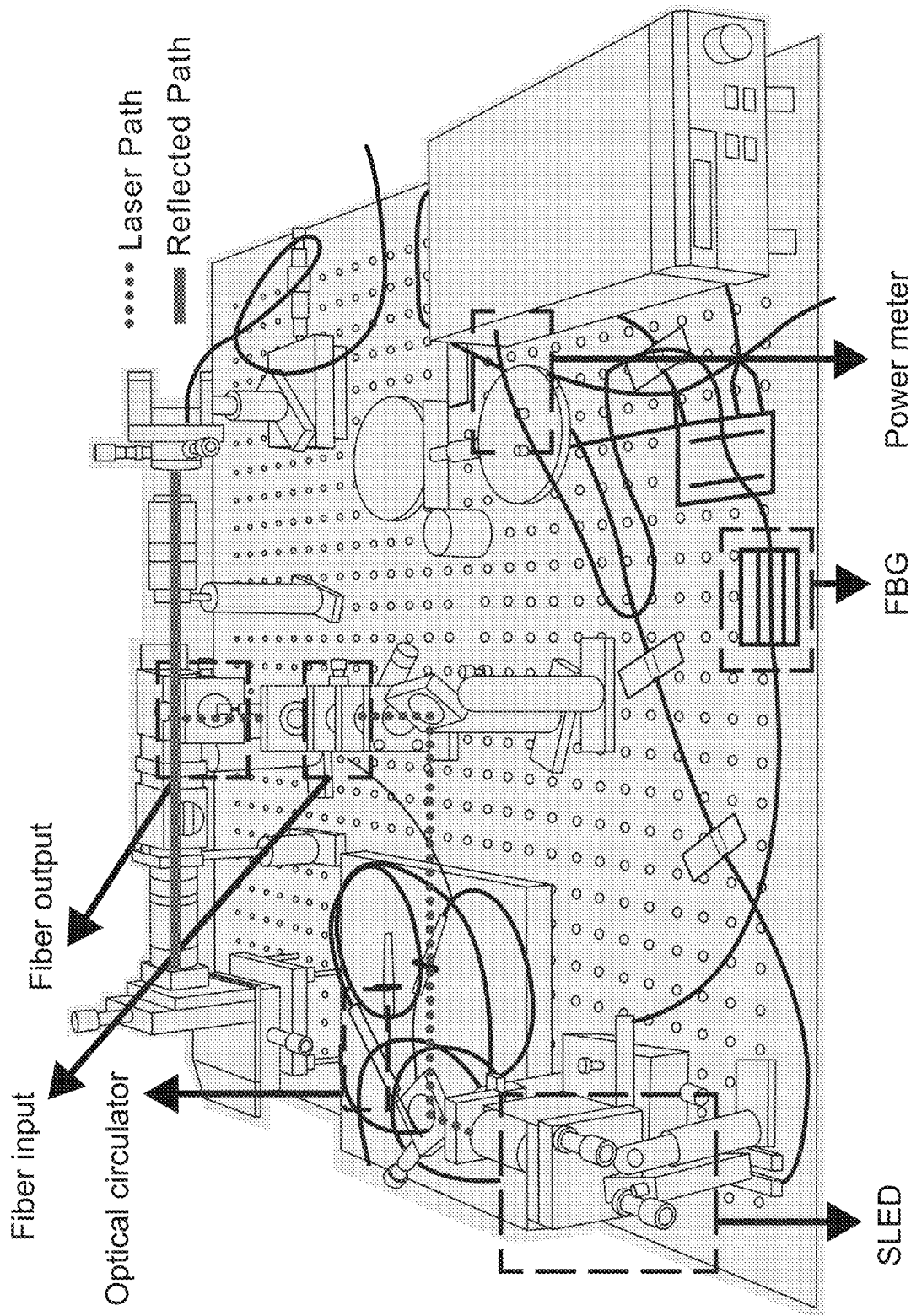
FIG. 23 shows the hardware configuration of FIG. 22 under low light conditions to visualize the fiber optic paths.

Although the light loss appears significant through the fibers in FIG. 23, this was minimal compared to the losses through low coupling efficiency. The coupling efficiency achieved was approximately 35%. As a result, one factor to consider in this current setup is the total amount of power delivered to the sample, which was on the order of a fraction of a mW. Yet, this is particularly well suited for experiments using SERS devices as shown in the following sections.

Testing Synchronization

Figure 24:
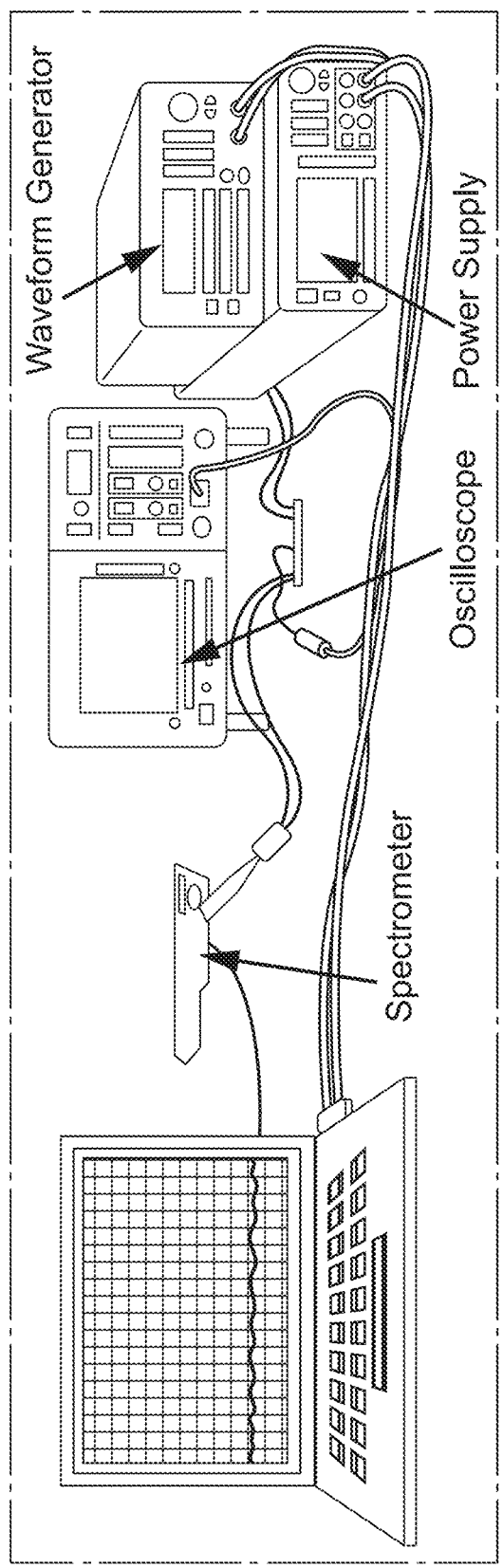
FIG. 24 shows the components used to synchronization all elements of the system of FIG. 22.

One aspect of the signal processing methodology outlined herein is the accurate synchronization of all components. In order to achieve this, a combination of a waveform generator, multi-channel power supply, and triggering functionality in the spectrometer were utilized. These components of the system are shown in FIG. 24.

Figure 25:
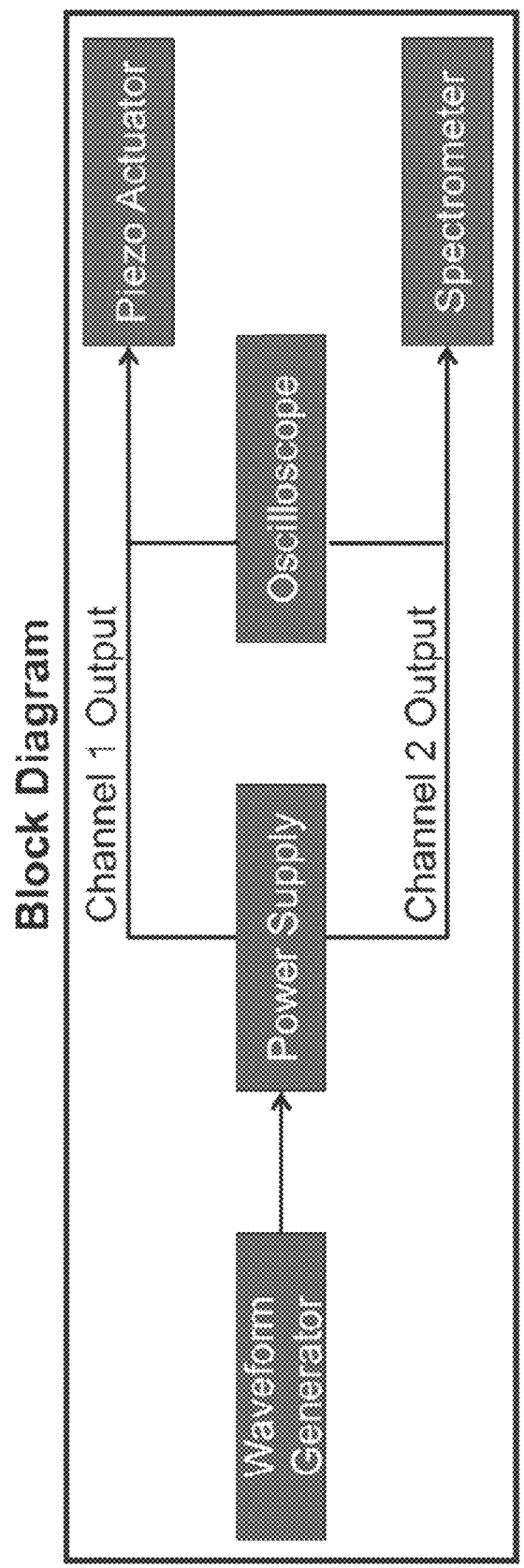
FIG. 25 shows a block diagram showing how some of the elements of the system of FIG. 22 are integrated.

The waveform generator was programmed with an arbitrary waveform. This arbitrary waveform represents the stochastic input that was generated in MatLab using methods described for FIGS. 19A-19C. The integration time can be adjusted and the points on the waveform are redistributed accordingly, which makes the setup versatile with respect to the sample requirements. The output from the waveform generator was connected to several I/O ports of the D-Sub connector on the back of the power supply. This permitted external triggering on the power supply. One channel from the power supply was connected to the piezo and output either 100 V or 0 V depending on the state of the waveform generator. Conversely, the second channel output a 3.3 V continuously synchronized pulse to the spectrometer I/O port. The spectrometer functionality was somewhat limited in terms of the response to an external pulse. Once it received a trigger pulse, the spectrometer would start an integration process that lasted a duration set by the software. As long as the 3.3 V was supplied, the data acquisition was continuous. A block diagram shown in FIG. 25 outlines this process, where the integrated elements are shown from left to right. An oscilloscope was used to monitor each channel.

Figure 26:
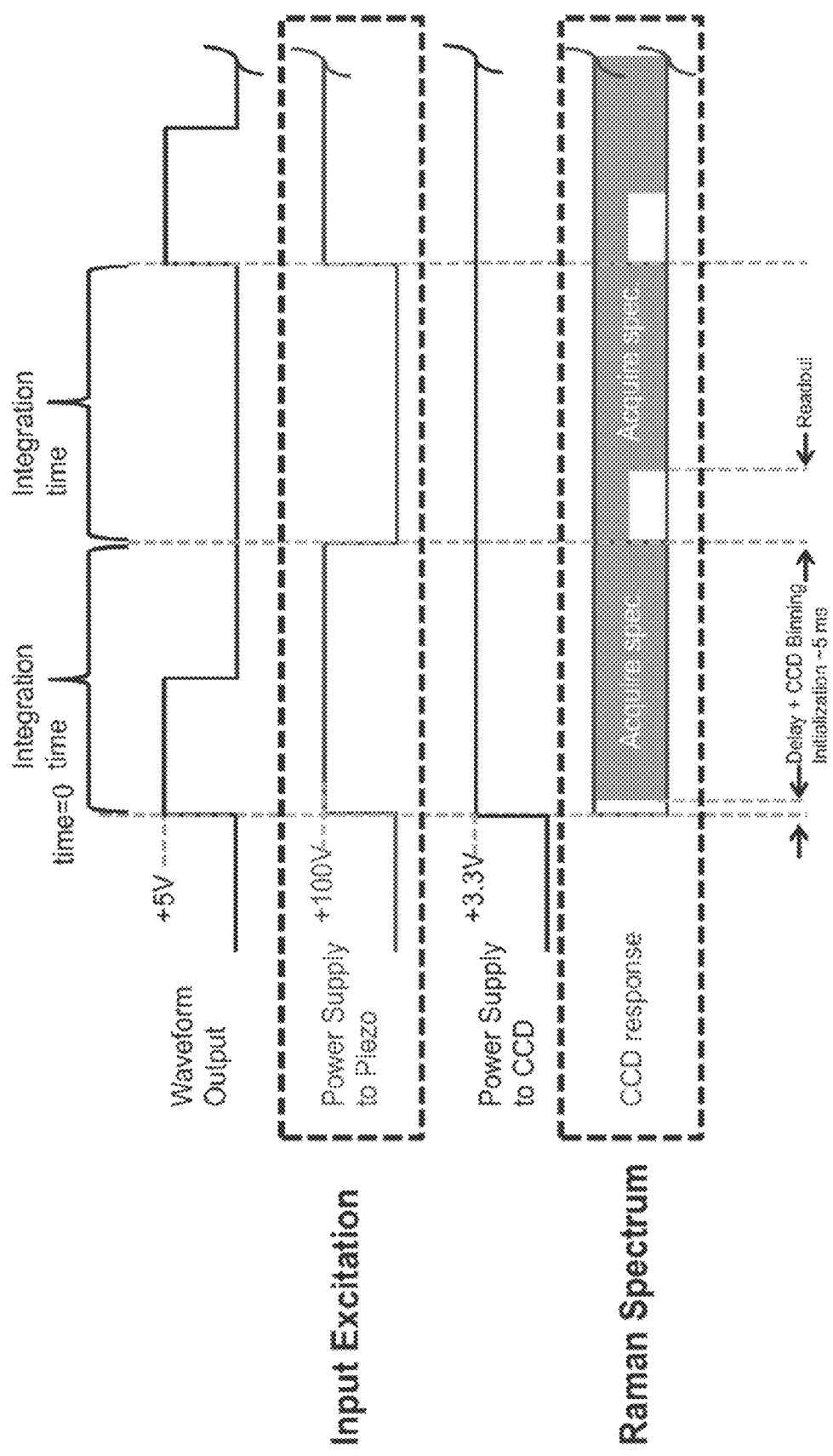
FIG. 26 shows the timing and synchronization of elements of the system of FIG. 22.

The pulse sequence is shown in more detail in FIG. 26. At the start of the process, a synchronized 5 V pulse was sent from the waveform generator to the power supply. The initial impulse sent 100 V to the piezo-actuator through channel 1 of the power supply. The duration of the pulse was set by the power supply to match the integration time of the spectrometer. At the same time, channel 2 outputs a continuous 3.3 V to the spectrometer for continuous data acquisition at a given integration time. The total duration of the 3.3 V pulse was set to be the entire length of the testing sequence (i.e. total number of samples multiplied by the integration time).

The response of the spectrometer CCD, when a pulse was received, was slightly more complicated. There was a delay in detector response due to a "binning initialization" that accumulated to about 5 ms. Relative to the length of a single acquisition, which ranges from 2 to 3 orders of magnitude longer than this, the delay in synchronization was nearly negligible and was overlooked rather than compensated for in the power supply response. The readout time occurred during the start of the following acquisition. The total readout time for this particular detector was less than 5 ms. So there was some overlap that caused the readout to contain information from the newly acquired spectrum. However, after review of the relative readout time compared to the total length of the acquired signal, this again becomes negligible.

With all elements of the system integrated and synchronized, it was now possible to test the functionality. In the current configuration, the laser power at the sample is limited by the SLED device and the FWHM of the reflected beam from the FBG. To obtain a stronger Raman signal, the system was applied to a sample absorbed on a SERS substrate. This provided an opportunity to test both the functionality of the existing system and the opportunity to show that shifted excitation techniques can be used on SERS substrates.

Application to Surface Enhanced Raman Spectroscopy (SERS)

SERS devices are fundamentally based on the enhancement in Raman scattering that occurs when an analyte is absorbed onto a metal nanostructure. Shifted excitation techniques can address several existing challenges associated with SERS substrates, which are outlined below:

Fluorescence: in both SERS and standard Raman systems, the fluorescence spectrum is an issue. In SERS, the fluorescence spectrum can be enhanced along with the Raman scatter. This is seen in the experimental data described later in this Example.

Background: the common sources of background in standard Raman systems are ambient environmental light leakage or pixel dark noise from the detector. Yet, with SERS devices, there is a "background matrix" or "continuum" from the substrate itself that adds to signal.

Signal Fluctuations: in the case of standard Raman systems, these fluctuations are caused by the sensitivity of the system to contamination and the relatively weak scatter compared to other phenomenology. SERS devices have fluctuations caused by complex coupling of surface plasmons to create local hotspots, which can lead to potential fluctuations in the Raman signal.

Applying shifted excitation techniques has the potential to address these issues. Yet, there is some uncertainty around whether shifted excitation techniques are directly applicable to SERS. This is because the surface plasmons are wavelength-dependent. Therefore, it is possible that the changes in spectral features will be too significant to be applicable with shifted excitation. To review this, a number of SERS substrates were procured, and the developed system was evaluated for use with these substrates.

SERS Samples

Go gain a better understanding of performance of SERS samples, three such samples were tested from three different SERS manufacturers. The objective was to find a reliable substrate that provided an enhancement and ideally select the one with the strongest enhancement to test with the developed system. The preparation of each of these devices varied greatly and this is described in more detail below:

SERSitive Preparation: 24 hour soak in the analyte followed by a rinse of in DI water or ethanol, then air dry at room temperature.

Silmeco Preparation: Drop the analyte onto the surface of the substrate and let it air dry at room temperature.

Enspectr Preparation: 1 minute soak in the analyte followed by a 1 mM rinse in ethanol, then air dry at room temperature.

SERS Measurements

The analyte used for the SERS measurements was Rhodamine 6G (R6G). This substance is typically used as a fluorescent dye in many applications and has a complex Raman spectrum with many features. The strong fluorescence spectrum provides a representative example of many molecules in practical applications. In addition to this, the R6G has a strong affinity to the metal surface based on the Hard and Soft (Lewis) Acids and Bases (HSAB) theory. Therefore, it is likely that there will be a significant number of "hotspots" where enhancements can occur. Analytical grade R6G was purchased from Sigma-Aldrich (product #56226). This was mixed with ethanol to achieve a concentration of approximately 0.4 mM or about 200 parts per million (ppm). The sample preparation procedure detailed above was followed for each substrate and they were then mounted onto a fixture for testing in the system. The raw spectrum of each of the samples is shown in FIG. 27.

Figure 27:
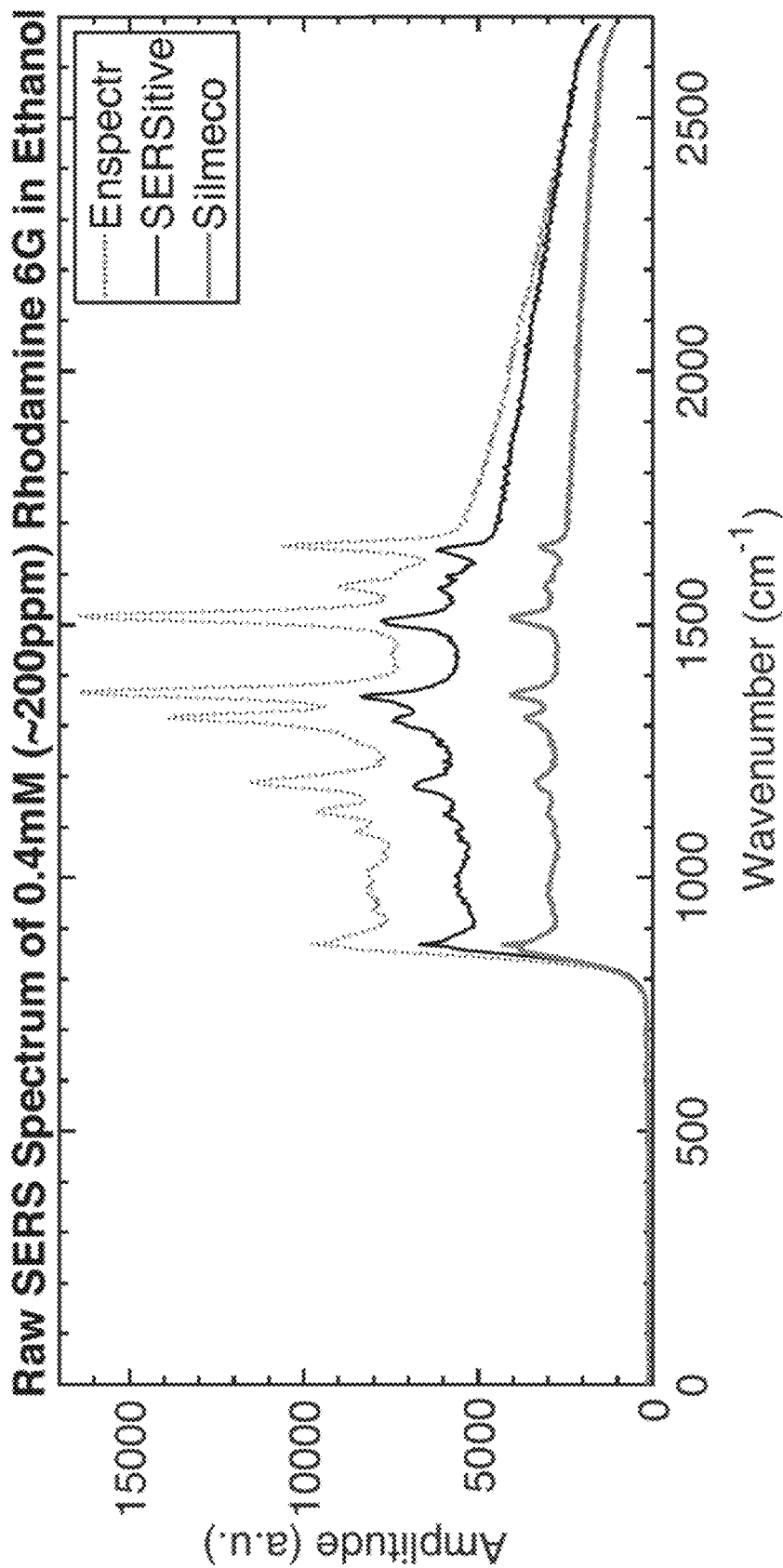
FIG. 27 is a plot of SERS spectra for multiple SERS devices, for 0.4 mM of R6G in ethanol.

As shown in FIG. 27, the strongest enhancement was from the Enspectr sample. This could be attributed to the fact that the Enspectr sample only contained silver nanoparticles as compared to gold and silver, which were present in the other samples. It is typical for silver to provide a stronger enhancement due to its dielectric properties. Yet, silver substrates have a shorter shelf life, as they tend to corrode, which makes them unusable. Consequently, many companies will provide a gold/silver hybrid or purely gold substrates to significantly increase the shelf life at the expense of a relatively weaker Raman enhancement. After about 10 days, it was noticed that the Enspectr enhancement began to weaken significantly, so timely preparation and measurement may be desirable.

There are other notable aspects that can be gleaned from FIG. 27 as well. The ratio of the Raman scattering intensity to the background/fluorescence signal is not uniform among all the substrates. The Enspectr substrate/sample has a higher ratio of Raman to fluorescence than the other two substrates. Hence, it appears as though the surface chemistry can play a role in this relationship. The stronger signal from the Enspectr substrates could originate from more scatterers "clinging" to the surface rather than a stronger enhancement in the areas of "hotspots." Ultimately, all of the data acquired from the three SERS devices was promising, and the Enspectr was chosen to test the variable excitation technique with the developed system.

The enhancement factor was computed by estimating the difference in number of molecules involved in the scattering process. Based on this calculation, it was estimated that the minimum enhancement was $10^4$. The Raman scatter features of Rhodamine 6G are highlighted in FIG. 28. The features vary in both width and height (i.e. signal strength), which makes the Enspectr sample an ideal sample for testing. In addition, the large sloping background and fluorescence spectrum makes it an ideal test case for using shifted excitation techniques on SERS The filter cutoff was placed at approximately 800 $cm^{-1}$, which masked two additional Raman features located below this value. Two gray boxes in FIG. 28 highlight the location of these peaks, which become apparent when the filter is replaced with a lower cutoff. Once it was verified that the SERS spectrum could be obtained and that R6G provided a sufficient sample, the stochastic methods were applied. The stochastic input vector is shown in FIG. 29.

Figure 30:
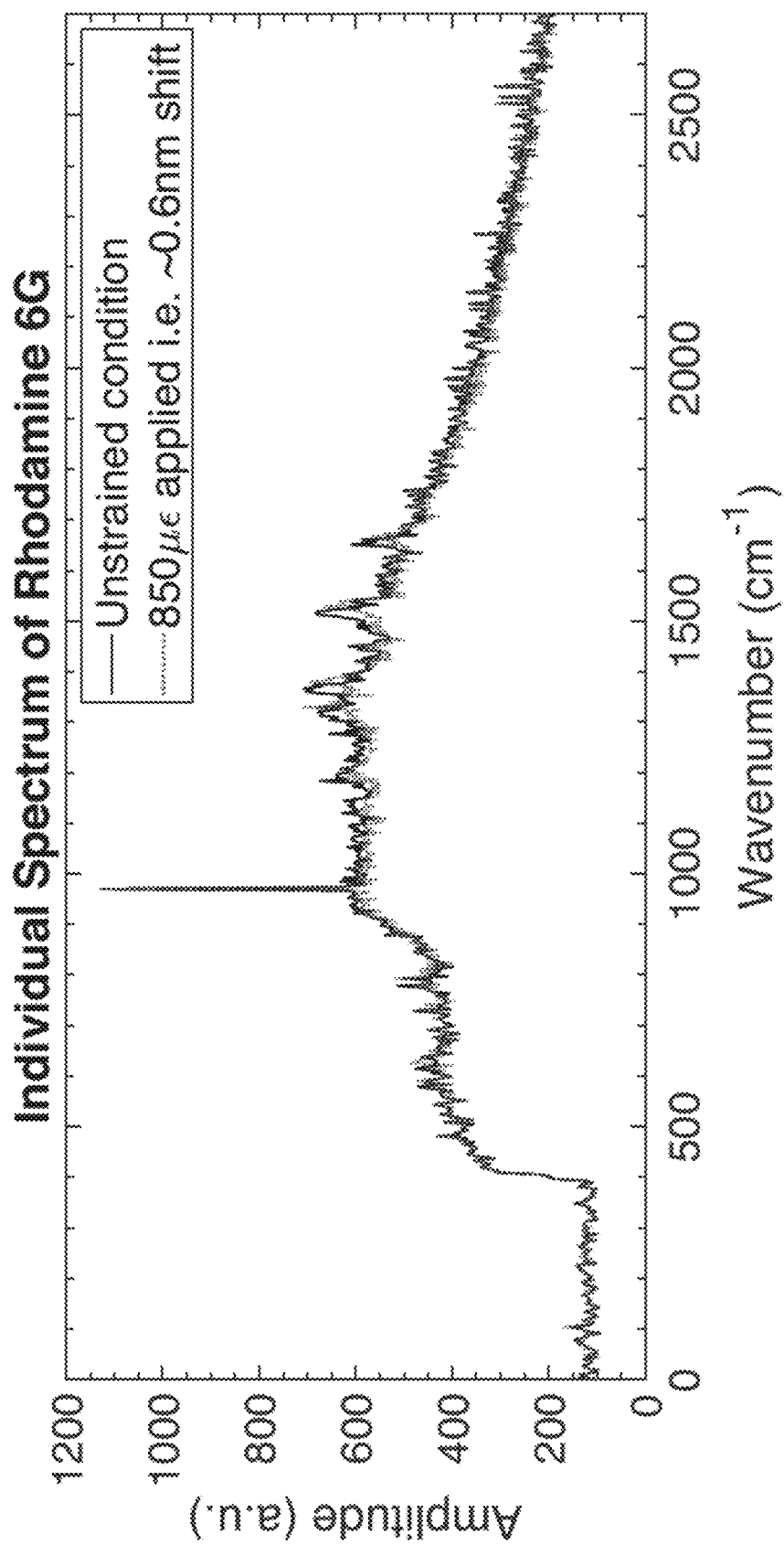
FIG. 30 is a plot showing two raw SERS spectra of measurements taken with the FBG (of FIG. 22) unstrained and strained.
Figure 31:
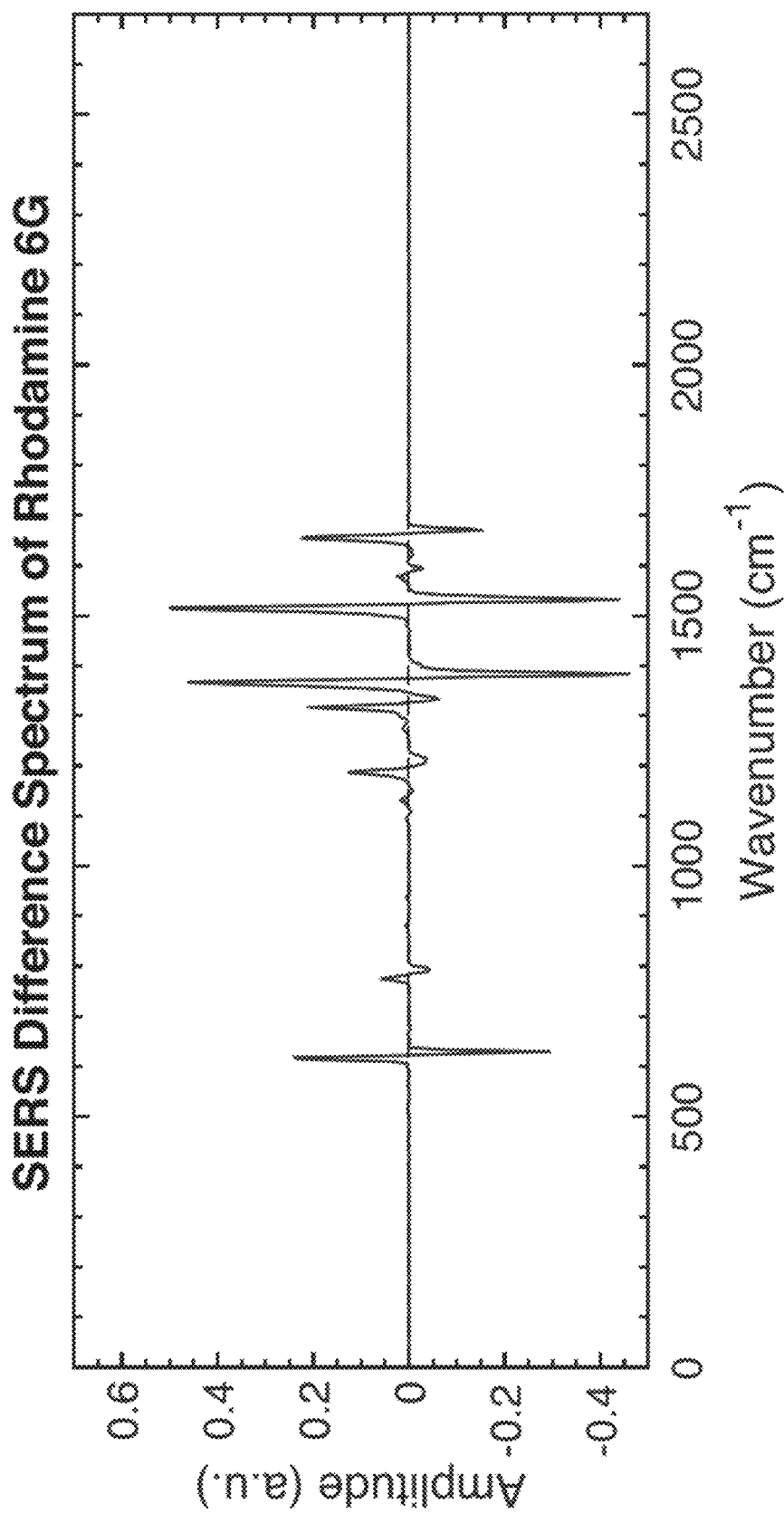
FIG. 31 is a plot showing a difference spectrum obtained using the scaled cross-correlation of R6G on SERS.

The long-pass filter was replaced with one that had a shorter cutoff wavelength so that the additional Raman features would be apparent. In addition, the integration time was reduced such that the Raman features were nearly invisible, and the spectrum showed a majority of fluorescence. FIG. 30 presents two acquired spectra, one with the FBG in the unstrained position and the other with the FBG strained to approximately 850µε, which corresponds to a shift in wavelength of approximately 0.6 nm. The sharp peak located near 900 $cm^{-1}$ is due to a high dark noise pixel and would be a source of a false detection The motivation for using the fairly large shift was because the Raman peaks were relatively broad in the R6G sample compared to the sharp Raman feature that was seen in the Diamond sample. Therefore, the larger shift would result in a more significant variation of the pixel amplitude in the locations with Raman scattering. This also tests the limits of the system from multiple aspects. First, the repeatability of the piezo-actuator is indirectly measured as the signal processing method is reliant on repeatable shifts between two excitation states. Second, larger shifts in excitation make the spectral response more likely to change—i.e. this is testing the limits of "Kasha's rule" on the SERS substrate with R6G. Results are shown in FIG. 31, where the difference spectrum is obtained using the scaled cross-correlation method. A thin dotted line at zero amplitude is shown as reference here as well.

Figure 28:
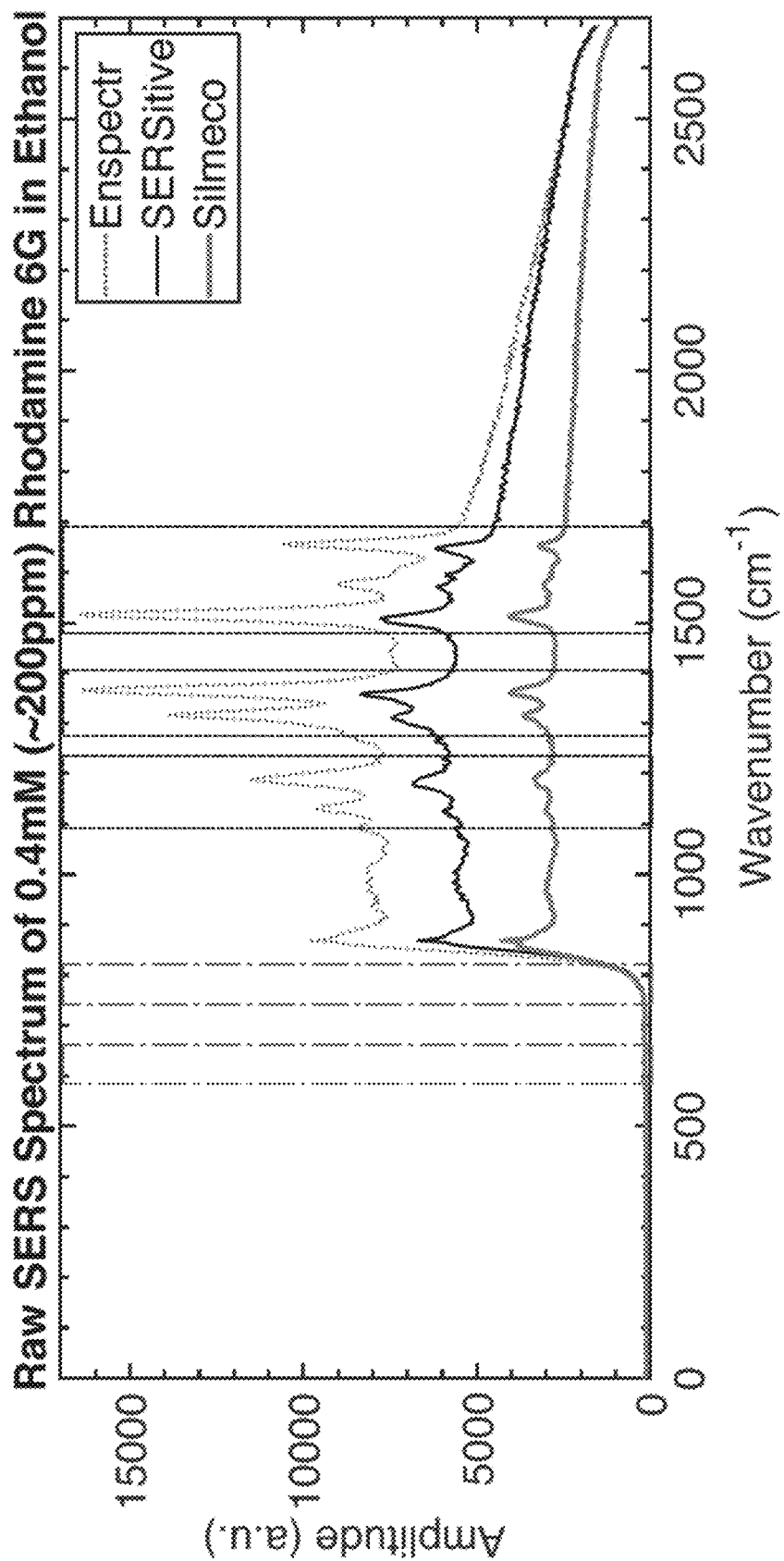
FIG. 28 is a plot of SERS spectra for multiple SERS devices, for 0.4 mM of R6G in ethanol, and with Raman scatter peaks isolated.
Figure 29:
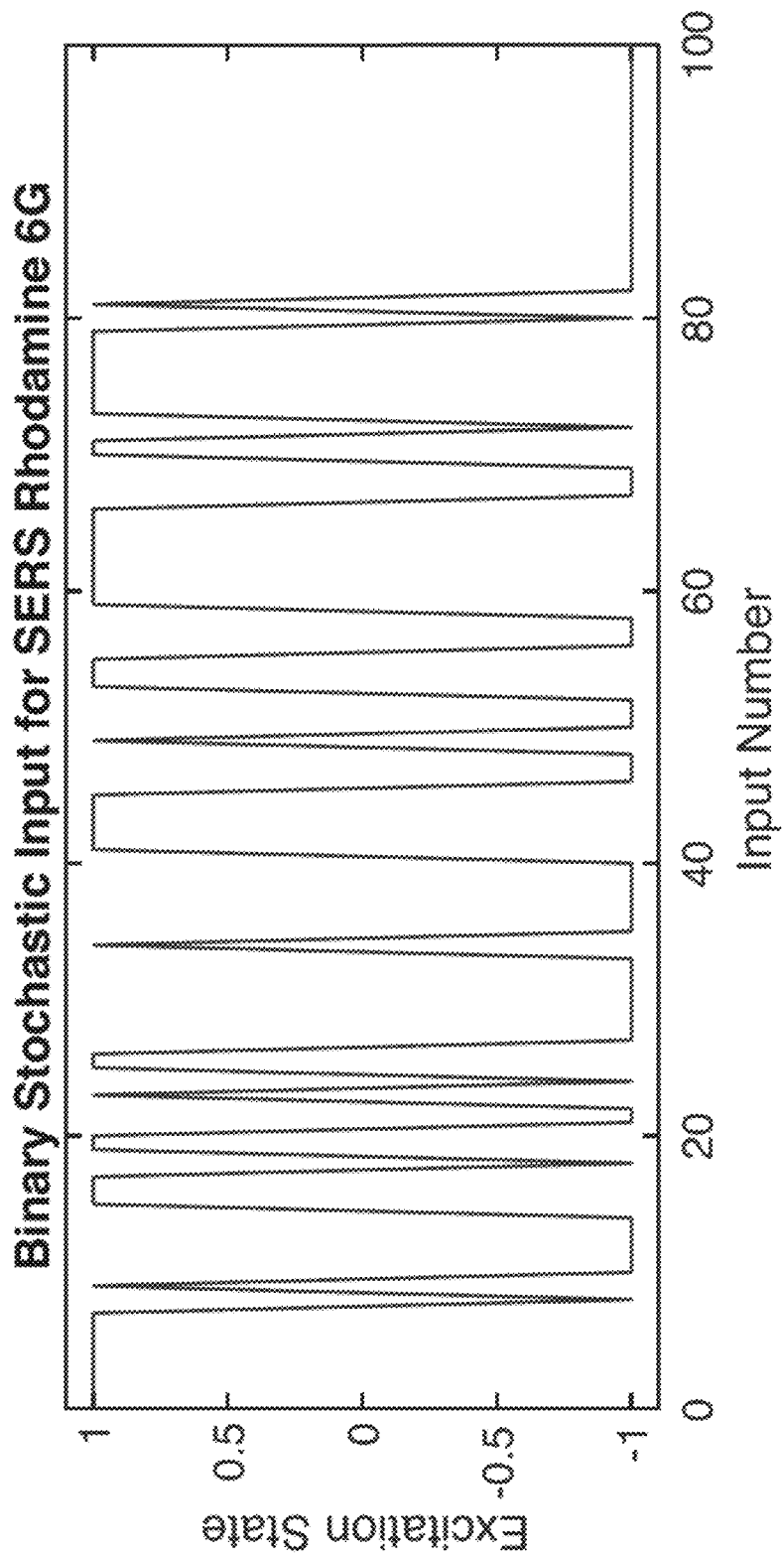
FIG. 29 is a plot illustrating an example binary stochastic input used for SERS R6G measurement.
Figure 32:
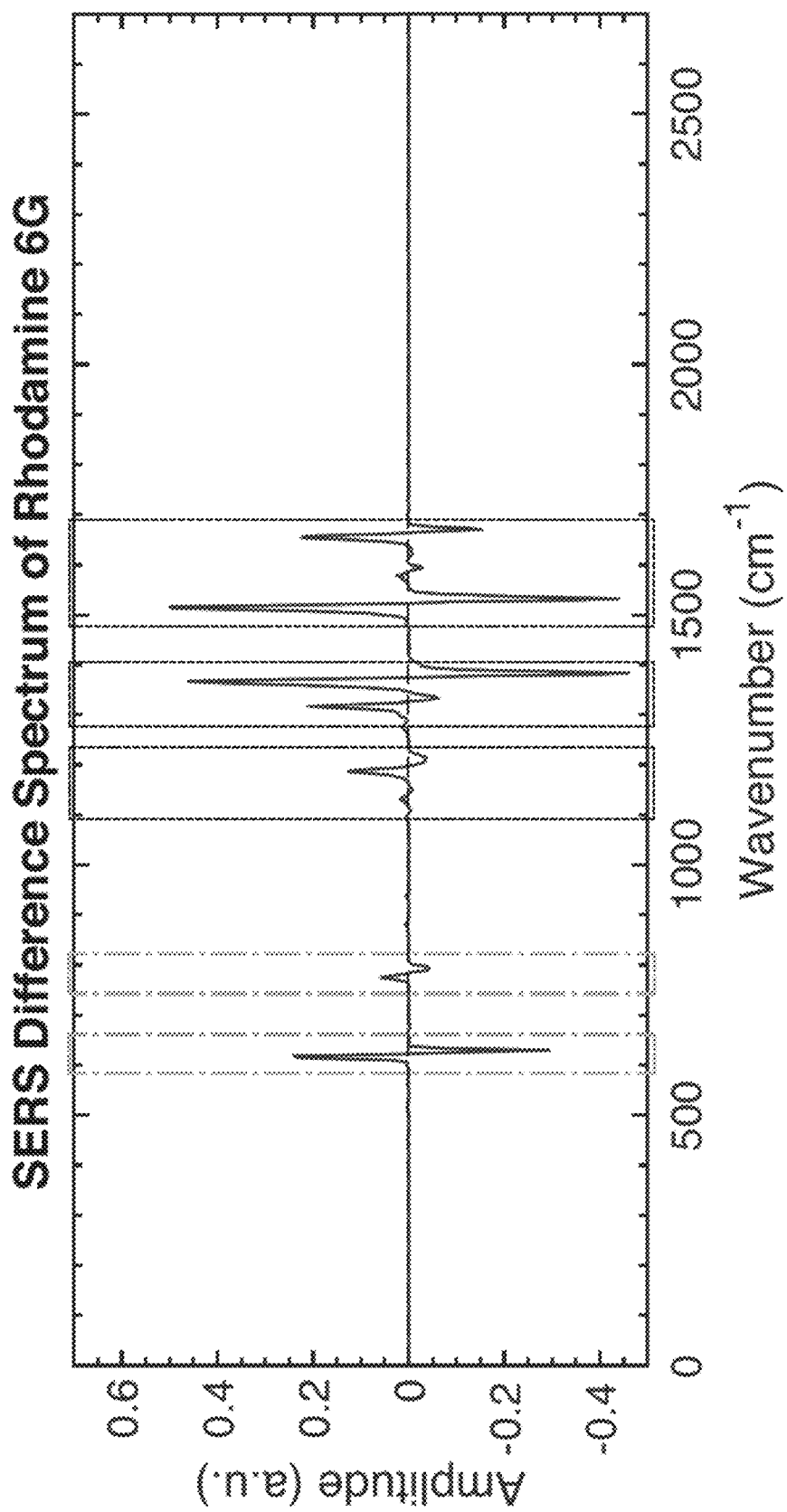
FIG. 32 is the plot of FIG. 31, with Raman scatter peaks isolated.

FIG. 32 shows an overlay of where the Raman peaks were highlighted in the original Raman spectrum from FIG. 28. From the spectral plot, it is apparent that the locations of the peaks are correctly identified. In addition, the relatively high SNR indicates that even with a low quality original spectrum, the derivative features of the Raman spectrum can be obtained.

The features shown in the difference spectrum for the R6G have a similar level of complexity as the original Raman spectrum. Yet, the results prove the use of variable excitation techniques in SERS. Additionally, it shows that this technique can be used to directly address the issues associated with SERS outlined earlier. Finally, this test demonstrates that all elements of the system have been successfully integrated and synchronized. The system was able to detect a strong signal from a concentration of 200 ppm of R6G and it is expected that the system can perform at significantly lower limits of detection given a longer integration time.

Conclusion

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A system, comprising:
a light source to illuminate a sample with an excitation signal that switches between a first excitation wavelength and a second excitation wavelength;
a spectrometer to detect a spectrum of an emission signal generated by a sample in response to excitation with the excitation signal, the emission signal including, for each excitation wavelength, a measure of emission intensity for that emission wavelength of the emission signal from the sample for that excitation wavelength; and a processor, communicably coupled to the light source and to the spectrometer, to:
compute a measure of correlation for each emission wavelength in the spectrum of the emission signal with the first excitation wavelength and the second excitation wavelength;
classify each emission wavelength as including Raman scatter where the measure of correlation for that emission wavelength exceeds a predetermined threshold; and
generate a derivative spectrum based on the measure of correlation for each emission wavelength.

2. The system of claim 1, further comprising:
a modulator, in optical communication with the light source, to receive the excitation signal from the light source and to modulate the excitation signal between the first excitation wavelength and the second excitation wavelength.

3. The system of claim 1, wherein the processor is configured to compute a cross-covariance between each emission wavelength and excitation information as the measure of correlation, the excitation information including a measure of excitation intensity for each excitation wavelength.

4. A method of Raman spectroscopy, comprising:
generating an excitation beam with a light source switching between a set of excitation wavelengths;
generating excitation information associated with the excitation beam, the excitation information including a measure of excitation intensity for each excitation wavelength of the set of excitation wavelengths;
illuminating a sample with the excitation beam;
detecting, for each excitation wavelength, an emission signal from the sample in response to the excitation beam;
generating emission information associated with the emission signal, the emission information including, for each excitation wavelength, a measure of emission intensity for each emission wavelength of the emission signal from the sample for that excitation wavelength;
computing a measure of correlation for each emission wavelength and the excitation information; and
classifying each emission wavelength as including Raman scatter where the measure of correlation for that emission wavelength exceeds a predetermined threshold,
wherein generating the excitation beam includes modulating the excitation beam between the set of excitation wavelengths over time, the excitation information including, at a given time, the measure of excitation intensity for the excitation wavelength at that given time, and further comprising:
generating a derivative spectrum based on the measure of correlation for each emission wavelength and the excitation information for a lag time=0 between that emission wavelength and the excitation information.

5. The method of claim 4, further comprising generating a scaled derivative spectrum by scaling the derivative spectrum by the measure of correlation for each emission wavelength and the excitation information at each lag time between an emission wavelength and the excitation information for lag time>0.

6. The method of claim 4, wherein the computing includes computing a cross-covariance between each emission wavelength and the excitation information as the measure of correlation.

7. A system for Raman spectroscopy, the system comprising:
a broadband light source to generate a light beam;
an optical circulator including a first port, a second port, and a third port, to receive the light beam at the first port and to output the light beam at the second port;
a fiber Bragg grating to receive the light beam from the second port and to reflect a portion of the light beam back into the second port as a Raman pump beam; and
a modulator coupled to the fiber Bragg grating to modulate a transmission spectrum of the fiber Bragg grating, such that a spectrum of the Raman pump beam is modified,
wherein the optical circulator outputs the Raman pump beam from the third port.

8. The system of claim 7, further comprising:
a dichroic beam splitter to:
receive the Raman pump beam from the third port of the optical circulator;
reflect the Raman pump beam towards a sample;
receive, from the sample, an emission signal including a Raman signal in response to the Raman pump beam; and
transmit a portion of the emission signal that includes the Raman signal;
a detector, in optical communication with the dichroic beam splitter, to receive and detect the portion of the emission signal; and
a processor, operably coupled to the detector, to generate a spectrum of the Raman signal based on the detected portion of the emission signal.

9. The system of claim 8, wherein the modulator is configured to switch a wavelength of the Raman pump beam between a first excitation wavelength and a second excitation wavelength, and the processor is configured to:
compute a measure of correlation for each emission wavelength in the spectrum of the Raman signal with the first excitation wavelength and the second excitation wavelength; and
classify each emission wavelength as producing Raman scatter where the measure of correlation for that emission wavelength exceeds a predetermined threshold.

10. The system of claim 7, wherein the fiber Bragg grating is configured to transmit a portion of the light beam as a transmitted beam,
wherein the optical circulator, the fiber Bragg grating, and the modulator collectively constitute an optical subsystem,
wherein the optical subsystem is a first optical subsystem of a set of optical subsystems in cascade,
wherein each optical subsystem, other than the first optical subsystem, is configured to receive the transmitted beam from the fiber Bragg grating of an upstream optical subsystem at the first port of the optical circulator of that optical subsystem.

11. The system of claim 10, wherein each modulator is configured to modulate the transmission spectrum of the corresponding fiber Bragg grating, such that each fiber Bragg grating of the system has a different transmission spectrum than each other fiber Bragg grating.

12. The system of claim 11, wherein each modulator is configured to modulate the transmission spectrum of the fiber Bragg grating of the optical subsystem including that fiber Bragg grating using a different stochastic modulation sequence than each other modulator.

13. A system of for Raman spectroscopy, the system comprising:
- a broadband light source to generate a light beam;
- an optical circulator including a first port, a second port, and a third port, to receive the light beam at the first port and to output the light beam at the second port; and
- a fiber Bragg grating to receive the light beam from the second port and to reflect a portion of the light beam back into the second port as a Raman pump beam,
- wherein the optical circulator outputs the Raman pump beam from the third port,
- wherein the third port is configured to output the Raman pump beam towards a sample, and wherein the optical circulator is configured to:
  - receive, from the sample and in response to the Raman pump beam, an emission signal at the third port; and
  - transmit the emission signal from a fourth port of the optical circulator.

14. A system of for Raman spectroscopy, the system comprising:
- a broadband light source to generate a light beam;
- an optical circulator including a first port, a second port, and a third port, to receive the light beam at the first port and to output the light beam at the second port; and
- a fiber Bragg grating to receive the light beam from the second port and to reflect a portion of the light beam back into the second port as a Raman pump beam,
- wherein the optical circulator outputs the Raman pump beam from the third port,
- wherein the fiber Bragg grating is configured to transmit a portion of the light beam as a transmitted beam,
- wherein the optical circulator and the fiber Bragg grating collectively constitute an optical subsystem,
- wherein the optical subsystem is a first optical subsystem of a set of optical subsystems in cascade,
- wherein each optical subsystem, other than the first optical subsystem, is configured to receive the transmitted beam from the fiber Bragg grating of an upstream optical subsystem at the first port of the optical circulator of that optical subsystem,
- wherein the optical circulator of each optical subsystem is configured to output the reflected beam of the fiber Bragg grating of that optical subsystem as a Raman pump beam towards a sample of a set of samples, and
- wherein each optical circulator is configured to:
  - receive, from the sample associated with that optical circulator and in response to that Raman pump beam, an emission signal at its third port; and
  - transmit the emission signal from a fourth port.

15. The system of claim 14, wherein each optical subsystem includes a subsystem waveguide coupled to the fourth port of the optical circulator of that optical subsystem, the system further including:
- a multiplexer circuit to couple each subsystem waveguide into a single output waveguide; and
- a detector coupled to the single output waveguide to receive and detect the emission signal from each sample.

16. The system of claim 15, further comprising a processor to:
- receive the emission signal from the detector;
- generate an emission spectrum for the set of samples; and
- generate, for each sample, a Raman spectrum based on the emission spectrum and modulation information for the fiber Bragg grating of the optical subsystem associated with that sample.

\* \* \* \* \*